United States Patent
Lovicott et al.

(10) Patent No.: US 10,353,446 B2
(45) Date of Patent: Jul. 16, 2019

(54) SYSTEMS AND METHODS OF ADAPTIVE THERMAL CONTROL FOR INFORMATION HANDLING SYSTEMS

(71) Applicant: DELL PRODUCTS L.P., Round Rock, TX (US)

(72) Inventors: Dominick Adam Lovicott, Round Rock, TX (US); Hasnain Shabbir, Round Rock, TX (US); Eric Tunks, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 113 days.

(21) Appl. No.: 15/707,649

(22) Filed: Sep. 18, 2017

(65) Prior Publication Data

US 2018/0004262 A1 Jan. 4, 2018

Related U.S. Application Data

(63) Continuation of application No. 14/664,317, filed on Mar. 20, 2015, now Pat. No. 9,785,208.

(51) Int. Cl.
*G06F 1/00* (2006.01)
*G06F 1/20* (2006.01)
*G06F 1/324* (2019.01)

(52) U.S. Cl.
CPC .............. *G06F 1/206* (2013.01); *G06F 1/324* (2013.01); *G05B 2219/49216* (2013.01); *Y02D 10/126* (2018.01); *Y02D 10/16* (2018.01)

(58) Field of Classification Search
CPC ............ G06F 1/206; G06F 1/324; G05B 2219/49216; Y02D 10/16; Y02D 10/126
See application file for complete search history.

(56) References Cited

U.S. PATENT DOCUMENTS

| | | | |
|---|---|---|---|
| 7,249,718 B2 | 7/2007 | Beitelmal et al. | |
| 8,014,971 B2 | 9/2011 | Artman et al. | |
| 8,532,826 B2 | 9/2013 | Moss et al. | |
| 2002/0105748 A1 | 8/2002 | Lamberts | |
| 2003/0110423 A1 | 6/2003 | Helms et al. | |
| 2004/0078454 A1 | 4/2004 | Abrahams et al. | |

(Continued)

OTHER PUBLICATIONS

Montero et al., "Systems and Methods for User Modification of Cooling Device Response in Information Handling Systems", U.S. Appl. No. 14/154,840, filed Jan. 14, 2014, DELL:173, 37 pgs.

(Continued)

*Primary Examiner* — Christopher E. Everett
(74) *Attorney, Agent, or Firm* — Egan Peterman Enders Huston

(57) ABSTRACT

Systems and methods of adaptive thermal control are provided for information handling system platforms that may be implemented to automate and scale fan control settings by making the fan control settings relative to a reported component thermal control parameter value from a component of an information handling system platform, such as a CPU or other heat generating component. In one example, bounds for system use of vendor or component manufacturer-reported thermal control parameter values may be set for system cooling so as to confine use of these values within information handling system platform limits characterized by a manufacturer of an information handling system platform.

20 Claims, 11 Drawing Sheets

(56) References Cited

U.S. PATENT DOCUMENTS

| | | |
|---|---|---|
| 2005/0223206 A1 | 10/2005 | Janzen et al. |
| 2006/0032250 A1 | 2/2006 | Flanigan et al. |
| 2006/0117779 A1* | 6/2006 | Liebenow .............. G01K 13/00 |
| | | 62/259.2 |
| 2009/0034342 A1 | 2/2009 | Miyamoto et al. |
| 2010/0115180 A1 | 5/2010 | Lee et al. |
| 2012/0010754 A1* | 1/2012 | Matteson ........... H05K 7/20836 |
| | | 700/282 |
| 2013/0226364 A1 | 8/2013 | Artman et al. |
| 2014/0032011 A1 | 1/2014 | Artman et al. |
| 2016/0274629 A1 | 9/2016 | Lovicott et al. |

OTHER PUBLICATIONS

Intel, Desktop 4$^{th}$ Generation Intel Core Processor Family, Desktop Intel Pentium Processor family, Desktop Intel Celeron Processor Family, and Intel Xeon Processor E3-1200 v3 Product Family, Dec. 2013, 42 pgs.

Intel, CPU Monitoring With DTS/PECI, Sep. 2010, 23 pgs.

Lin et al., "Self-Tuning of PID Controllers by Adaptive Interaction", Proc. American Control Conference, Jun. 2000, 6 pgs.

* cited by examiner

SYSTEMS AND METHODS OF ADAPTIVE THERMAL CONTROL FOR INFORMATION HANDLING SYSTEMS

This application is a continuation of U.S. patent application Ser. No. 14/664,317, filed on Mar. 20, 2015 and entitled "Systems And Methods Of Adaptive Thermal Control For Information Handling Systems" which is incorporated herein by reference in its entirety for all purposes.

FIELD OF THE INVENTION

This invention relates generally to information handling systems and, more particularly, to thermal control for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One or more cooling fans are typically employed within the chassis of information handling system platforms, such as servers, to cool components operating within the information handling system chassis. Such cooling fans may be uncontrolled, i.e., running at full power whenever the information handling system is a powered on state. However, cooling fans consume power, create noise, and create airflow, each of which becomes of greater concern in a data center where a plurality of information handling system platforms may be operating, e.g., as servers. Cooling fans may also be controlled based on ambient temperature within an information handling system chassis.

Thermal tables have been provided in system memory that specify fan speed RPM values for each respective cooling fan of an information handling system platform at a given temperature (or alternatively at a given range of sensed temperature) within the chassis enclosure of an information handling system platform. The specified fan speed (e.g., RPM) values and baseline temperature response of such a thermal table are pre-defined based on thermal engineering and default thermal loadings for different system components, and are selected to help ensure sufficient cooling of the components of a given default system configuration that includes a specific default number and type/s of system components. As the sensed operating temperature within the system chassis increases or decreases, the fan speed of each of the given system cooling fans is automatically increased or decreased according to a pre-defined linear (X-Y) relationship of the thermal table that specifies increasing fan speed with increasing temperature.

Thermal control techniques have been developed for information handling system platforms in an attempt to reduce power consumption, airflow and acoustic noise generated by cooling fans. Such techniques include proportional-integral-derivative (PID) control loop feedback. Closed loop thermal control techniques have utilized temperature information provided from individual components of an information handling system platform, such as central processing unit (CPU), hard disk drive (HDD) and redundant array of independent disks (RAID) hardware (RAID card). Conventional CPU thermal control for information handling system platforms such as servers is typically implemented based on a combination of register values that are read directly from the CPU and system manufacturer-defined table values that are based on system characterization and maintained in system memory. Although many server components have a fixed temperature requirement that is stable throughout development of an information handling system architecture, CPU thermal requirements are often changed by the CPU manufacturer for given type of CPU during the course of the information handling system platform architecture development. To further complicate matters, CPU thermal requirements may also vary as a function of CPU stock keeping unit (SKU), and loading and performance settings, e.g., such as enhanced halt state (C1E) disabled. CPU manufacturers reserve the right to change CPU thermal requirements and register values until late in system manufacturer development phases. Occasionally, the requirements are incorrectly documented. Other times, qualification sample parts are incorrectly programmed with faulty values, resulting in bad thermal settings in system manufacturer thermal control tables.

FIGS. 1-4 illustrate CPU die operating temperature as a function of time where conventional thermal control setpoint methodology is used to control information handling system cooling fan speed in real time based on sensed changes in CPU die operating temperature of a server for four respective different CPU devices of the same type of CPU device. In each case, the real time server CPU temperature is sensed by integrated CPU digital thermal sensing circuitry and reported (as an offset value relative to CPU thermal throttling temperature threshold described below) to a server baseboard management controller (BMC) that controls cooling fan speed based on the reported CPU temperature using fixed controller gains. In FIGS. 1-4, the CPU thermal throttling temperature threshold is a register value maintained by the given CPU device that represents a CPU temperature threshold set by the CPU manufacturer and above which the CPU provides a critical temperature warning and a CPU thermal throttling control circuit of the CPU is activated by a thermal monitor of the CPU to reduce the CPU die temperature using clock modulation and/or by throttling down the CPU clock speed and operating input voltage until the sensed CPU temperature drops again drops below the CPU thermal throttling temperature threshold. A separate CPU fan control target temperature setpoint value is a static CPU register value that is set by the CPU manufacturer below the maximum CPU temperature (or CPU thermal throttling temperature threshold). The CPU fan control target temperature setpoint value is a target or desired CPU die operating temperature that is set by the manufacturer for the individual CPU device.

In FIGS. 1-4, the CPU fan control target temperature setpoint value is intended to be read from the CPU register and used by the BMC as a setpoint for increased fan speed control for cooling the CPU in an attempt to maintain the real time CPU die operating temperature at the retrieved CPU fan control target temperature setpoint value and to prevent the real time CPU die operating temperature from reaching the CPU thermal throttling temperature threshold. However, actual CPU cooling characteristics may vary due to the particular cooling characteristics of a given server system platform configuration, including the particular combination and geometry of system heat-generating components, cooling fans and chassis enclosure. Thus, CPU thermal throttling temperature threshold may be exceeded in some cases due to system cooling capability limits even when the server BMC uses the retrieved CPU fan control target temperature setpoint value to trigger the system cooling fans. In an attempt to prevent this from occurring, a manufacturer of an information handling system platform may decide to set its own thermal control setpoints during system development that are more stringent than the maximum CPU temperature/CPU thermal throttling temperature threshold and CPU fan control target temperature setpoint values. These system manufacturer thermal control setpoints may be used to control cooling fan speed based on actual information handling system component configuration, chassis configuration, and system cooling fan characteristics/capacity in an attempt to ensure that the CPU temperature never reaches CPU thermal throttling temperature threshold and CPU thermal throttling activation even when the CPU fan control target temperature setpoint value is set too high for the actual server system cooling capability.

Specifically, in FIGS. 1-4 a system fan control target setpoint temperature value may be set by a manufacturer of an information handling system platform at a CPU temperature below the CPU fan control target temperature setpoint value and stored in BMC non-volatile memory as a fixed fan control target (FTC) offset value below the fixed CPU fan control target temperature setpoint value read from the CPU register of a given CPU of a particular information handling system platform instantiation as shown by the downward arrow in FIGS. 1-4. Thus, the system manufacturer system fan control target setpoint temperature value across different information handling system platform instantiations is allowed to automatically move upward or downward as CPU manufacturer changes to the CPU fan control target temperature setpoint value occur between different CPU devices, e.g., changes due to different CPU stock keeping unit (SKU), different loading and performance settings, etc. In this regard, the CPU fan control target temperature setpoint value is a fixed value for each individual CPU device part, but may vary between different individual CPU device parts of the same type, such that a first individual CPU device installed in a first information handling system platform instantiation is provided by the CPU manufacturer with a different CPU fan control target temperature setpoint value than a second individual CPU device of the same CPU type of CPU device that is installed in a separate second information handling system platform instantiation. Thus, the resulting system manufacturer system fan control target setpoint temperature is automatically set by the BMC of the second information handling system platform to a different temperature value than the system manufacturer system fan control target setpoint temperature set by the BMC of the first information handling system platform, even though the second CPU device installed in the second information handling system platform is the same type of CPU device as the first CPU device installed in the first information handling system platform.

Still referring to FIGS. 1-4, the information handling system manufacturer may also set a specified system power capping threshold temperature value in BMC non-volatile memory that is below the CPU thermal throttling temperature threshold and above the CPU fan control target temperature setpoint value specified and set by the CPU manufacturer. This system manufacturer power capping threshold temperature value is supposed to be represent a CPU temperature value below the CPU thermal throttling temperature threshold where the system BMC initiates CPU throttling. However, as further described below, CPU thermal throttling temperature threshold may be changed upwards or downwards between different CPU devices of the same type without notice by the CPU manufacturer, sometimes in a manner that places CPU thermal throttling temperature threshold below the system manufacturer power capping threshold temperature value.

FIG. 1 illustrates an example where the conventional thermal control setpoint methodology descried above is working correctly for a first given CPU device. As shown in FIG. 1, CPU die operating temperature increases with time and triggers cooling fan speed increase by the system BMC when the CPU temperature reaches the system fan control target setpoint temperature value set by the information handling system manufacturer. With the increased cooling fan speed, the CPU temperature is controlled to be the specified system manufacturer system fan control target setpoint threshold and such that the CPU temperature does not exceed either the system manufacturer power capping threshold temperature or the CPU thermal throttling temperature threshold, and thus CPU thermal throttling control is not activated and no CPU throttling or temperature warnings are required.

In the conventional example of FIG. 2, the CPU manufacturer has relaxed (or raised) the CPU fan control target temperature setpoint value stored in the register of a second and different given CPU device that is the same type of CPU device as the first CPU device of FIG. 1. This may be done by a CPU manufacturer, for example, in an attempt to increase performance of a given type of CPU and/or to decrease cooling fan use. As shown in FIG. 2, the CPU fan control target temperature setpoint value has been raised in this case above the power capping threshold temperature value set by the information handling system manufacturer, and this in turn raises the system manufacturer system fan control target setpoint value used by the system BMC. Thus, in FIG. 2 cooling fan speed increase is not triggered until a higher CPU temperature than was the case in the example of FIG. 1. This causes the CPU die operating temperature to overshoot or exceed both the system manufacturer power capping threshold temperature and the CPU thermal throttling temperature threshold, in turn causing CPU throttling and CPU thermal throttling activation before the CPU temperature is eventually controlled to the system manufacturer system fan control target setpoint temperature.

In the example of FIG. 3, the CPU manufacturer has lowered the CPU fan control target temperature setpoint value stored in the register of a third and different given CPU device that is the same type of CPU device as the first and second CPU devices of respective FIGS. 1 and 2. This lowering of CPU fan control target temperature between different CPU devices is represented by the downward pointing cross-hatched arrow in FIG. 3. Thus, in FIG. 3, cooling fan speed increase is triggered earlier at a lower CPU temperature than was the case in the example of FIG. 1. In this case, the temperature control gain value/s used by the BMC to regulate cooling fan speed are tuned by the information handling system platform manufacturer for the original higher CPU fan control target temperature setpoint value of FIG. 1. Consequently, CPU temperature and fan speed response are not stable, but rather oscillates as shown above and below the system manufacturer system fan control target setpoint temperature and may exceed the system manufacturer power capping threshold as shown, resulting in undesired CPU throttling initiated by the BMC.

In the example of FIG. 4, the CPU manufacturer has lowered the CPU thermal throttling temperature threshold value stored in the register of a fourth and different given CPU device that is the same type of CPU device as the first, second and third CPU devices of respective FIGS. 1, 2 and 3. In this case the CPU thermal throttling temperature threshold has been lowered below the fixed or static power capping threshold temperature value set in the BMC by the information handling system platform manufacturer. Consequently, CPU temperature is allowed to exceed the new CPU thermal throttling temperature threshold before reaching the system manufacturer power capping threshold temperature, which results in the undesirable consequences of a critical temperature warning and CPU thermal throttling activation described above.

As illustrated in FIGS. 1-4, there is a significant risk of having information handling system manufacturer-specified thermal control parameters/setpoints that aren't optimized for the CPU thermal control parameters/setpoints of the CPU devices that are actually installed and/or shipped with a given information handling system platform instantiation. This can result in factory or field failures as a result of this problem. Moreover, changes in CPU manufacturer thermal requirements and/or thermal parameter register values creates system manufacturer workload churn for the thermal control tuning and validation as well as driving additional builds and code validation. Additionally, taking advantage of temperature relief provided by the CPU thermal profile results in risk of CPU thermal throttling activation.

A CPU thermal profile has also been specified by the CPU manufacturer and stored in the CPU register to define a relationship between a CPU fan control target setpoint temperature and CPU operating power. In such a case, the BMC may read the particular value of CPU fan control target setpoint temperature from the CPU thermal profile at the current CPU operating power, and use this read CPU thermal profile value as the fan control target setpoint temperature value for fan speed control at the current CPU operating power. The fan control target setpoint temperature from the CPU thermal profile increases with increasing CPU operating power to allow the CPU fan control target setpoint temperature value to eventually equal the specified CPU thermal throttling temperature threshold value for the CPU, which causes risk of CPU thermal throttling activation in the case of slight CPU temperature overshoot above the CPU thermal throttling temperature threshold value.

SUMMARY OF THE INVENTION

Disclosed herein are systems and methods of adaptive thermal control for information handling system platforms (e.g., such as server platforms) that may be implemented to automate and scale fan control settings (e.g., which in the past have been treated as conventional absolute fan control settings) by making the fan control settings relative to a reported component thermal control parameter value (e.g., such as a component fan control target setpoint value or component thermal throttling temperature threshold value) from a component of an information handling system platform, such as a CPU or other heat generating component. In one exemplary embodiment, the disclosed system and methods may be further used to define bounds for system use of vendor or component manufacturer-reported thermal control parameter values (e.g., such as a component fan control target setpoint values or component thermal throttling temperature threshold values) for system cooling so as to confine use of these values within information handling system platform limits characterized by a manufacturer of an information handling system platform.

In one exemplary embodiment, the disclosed systems and methods may employ adaptive thermal control parameters (e.g., such as system power capping threshold values, system fan control target setpoint values, and controller gains) in closed loop thermal control techniques in a manner that doesn't blindly rely on the hard-coded thermal control parameter or setpoint values that are stored in the register/s of a CPU or other type of heat-generating component. For example, in the case of a CPU installed in an information handling system platform, the disclosed systems and methods may be implemented to set platform thermal control parameter limits to control cooling fan behavior based on CPU operating temperature and hard-coded CPU thermal control parameter/setpoint values in an adaptive manner that ensures that the hard-coded CPU register values cannot be changed enough (e.g., by the CPU manufacturer) between CPU devices to negatively impact the information handling system performance. Advantageously, the disclosed systems and methods may be so implemented to eliminate the risk of reaching higher CPU die operating temperatures that are sufficiently high to cause critical temperature warning, thermal throttling activation or undesirable fan control behavior (e.g., such as fan speed oscillations). Although described herein in relation to cooling an information handling system CPU based on CPU thermal control parameter/setpoint values stored in a CPU register/s, it will be understood that the disclosed systems and methods may be similarly implemented for adaptive thermal control of any other type of information handling system platform component that reports its temperature and target setpoint thermal control values, or from which target setpoint spec cooling temperatures are read directly from the component. Examples of such other types of components include, but are not limited to, graphics processing units (GPUs), RAID controllers, volatile memory devices, non-volatile memory devices, hard drives, solid state drives, network adapters, storage adapters, power supply components, etc.

The disclosed systems and methods may be implemented in one embodiment in a manner that eliminates the need to keep exact accounting for actual CPU temperature specs within a thermal table, and that also eliminates vulnerability to changes in CPU thermal control parameters that may be implemented by a CPU manufacturer between different CPU devices. Advantageously, the disclosed systems and methods may also be implemented in a manner that eliminates the need to define each CPU bin for configuration detection and accounting for each CPU specific spec. Thus, the disclosed systems and methods may be implemented in one embodiment without defining a separate Tier for each CPU bin (i.e., even though temperature parameter specs are specific to a bin), and without defining fan control cooling setpoints for each CPU device. Rather, the disclosed systems and methods may be implemented in a manner that is CPU bin agnostic (from a temperature target setpoint perspective).

In one respect, disclosed herein is an information handling system, including: a chassis enclosure; at least one heat-generating component to be cooled that is contained within the chassis enclosure that consumes electrical power for operation, the heat-generating component including memory storing at least one component thermal control parameter that includes a component thermal throttling temperature threshold value; at least one temperature sensor configured to sense and report an operating temperature of the heat generating component; one or more variable speed cooling fans configured to provide different flow rates of cooling air within the chassis enclosure to cool the heat generating component; system persistent storage separate from the heat-generating component to be cooled, the persistent storage including system thermal control parameter information stored thereon, the system thermal control parameter information defining a relationship between values of the component thermal throttling temperature threshold and values of one or more system thermal control parameters; and at least one processing device separate from the heat generating component that is coupled to receive values of real time sensed component temperature from the temperature sensor, and to provide control signals to control a fan speed of each of the cooling fans to cool the heat-generating component and/or to control power consumption of the heat-generating component. In one embodiment, the processing device may be coupled to retrieve the component thermal throttling temperature threshold value stored in the memory of the heat-generating component, and may be further coupled to retrieve the system thermal control parameter information stored on the system persistent storage. The processing device may be further configured to determine a value of at least one system thermal control parameter based on the retrieved component thermal throttling temperature threshold value and the retrieved relationship between values of component thermal throttling temperature threshold and values of one or more system thermal control parameters, and to control cooling fan speed of one or more of the cooling devices and/or control power consumption of the heat-generation component based on a combination of the determined system thermal control parameter value and the value of the real time current sensed component temperature.

In another respect, disclosed herein is an adaptive method for controlling cooling fan response in an information handling system, including: operating at least one heat-generating component that consumes electrical power within an information handling system chassis enclosure, the heat-generating component including memory storing at least one component thermal control parameter that includes a component thermal throttling temperature threshold value; using one or more variable speed cooling fans to provide different flow rates of cooling air within the chassis enclosure to cool the heat generating component; using at least one temperature sensor to sense an operating temperature of the heat generating component in real time; and using at least one processing device separate from the heat generating component to: retrieve the component thermal throttling temperature threshold value stored in the memory of the heat-generating component, receive values of real time sensed component operating temperature from the temperature sensor, determine a value of at least one system thermal control parameter based on the retrieved component thermal throttling temperature threshold and a defined relationship between values of component thermal throttling temperature threshold and values of system thermal control parameter, and control cooling fan speed of one or more of the cooling devices and/or control power consumption of the heat-generation component based on a combination of the determined system thermal control parameter value and the value of the real time current sensed component temperature.

In another respect, disclosed herein is an information handling system, including: a chassis enclosure; at least one heat-generating component to be cooled that is contained within the chassis enclosure that consumes electrical power for operation, the heat-generating component including memory storing at least one component thermal control parameter that includes a component fan control target setpoint temperature value; at least one temperature sensor configured to sense and report an operating temperature of the heat generating component; one or more variable speed cooling fans configured to provide different flow rates of cooling air within the chassis enclosure to cool the heat generating component; system persistent storage separate from the heat-generating component to be cooled, the persistent storage including system thermal control parameter information stored thereon, the system thermal control parameter information defining a relationship between different values of closed loop controller gains as a function of different component fan control target setpoint temperature values; and at least one processing device separate from the heat generating component that is coupled to receive values of real time sensed component temperature from the temperature sensor, and to implement a closed loop process controller to provide control signals to control a fan speed of each of the cooling fans to cool the heat-generating component based on the received values of real time sensed component temperature. In one embodiment, the processing device may be coupled to retrieve the component fan control target setpoint temperature value stored in the memory of the heat-generating component, and may be further coupled to access the system thermal control parameter information stored on the system persistent storage. The processing device may be further configured to determine a value of at least one closed loop controller gain for the closed loop process controller based on the retrieved component fan control target setpoint temperature value and the relationship between different values of closed loop controller gains as a function of different component fan control target setpoint temperature values, and to use the at least one determined closed loop controller gain in the closed loop process controller to further provide the control signals based on the retrieved component fan control target setpoint temperature value and a selected fan control target setpoint temperature value to control a fan speed of each of the cooling fans to cool the heat-generating component.

In another respect, disclosed herein is an adaptive method for controlling cooling fan response in an information handling system, including: operating at least one heat-generating component that consumes electrical power within an information handling system chassis enclosure, the heat-generating component including memory storing at least one component thermal control parameter that includes a component fan control target setpoint temperature value; using one or more variable speed cooling fans to provide different flow rates of cooling air within the chassis enclosure to cool the heat generating component; using at least one temperature sensor to sense an operating temperature of the heat generating component in real time; using at least one processing device separate from the heat generating component to: retrieve the component fan control target setpoint temperature value profile stored in the memory of the heat-generating component, and receive values of real time sensed component temperature from the temperature sensor;

and using at least one processing device separate from the heat generating component to: determine a value of at least one closed loop controller gain for a closed loop process control based on the retrieved component fan control target setpoint temperature value and a relationship between different values of closed loop controller gains as a function of different component fan control target setpoint temperature values, receive values of real time sensed component temperature from the temperature sensor, implement a closed loop process controller to provide control signals to control a fan speed of each of the cooling fans to cool the heat-generating component based on the received values of real time sensed component temperature, and use the at least one determined closed loop controller gain in the closed loop process controller to further provide the control signals based on the retrieved component fan control target setpoint temperature value and a selected fan control target setpoint temperature value to control a fan speed of each of the cooling fans to cool the heat-generating component.

In another and first additional respect, disclosed herein is an information handling system, including: a chassis enclosure; at least one heat-generating component to be cooled that is contained within the chassis enclosure that consumes electrical power for operation, the heat-generating component including memory storing at least one component thermal control parameter that includes at least one of a component thermal throttling temperature threshold value or a component fan control target setpoint temperature value; at least one temperature sensor configured to sense and report an operating temperature of the heat generating component; one or more variable speed cooling fans configured to provide different flow rates of cooling air within the chassis enclosure to cool the heat generating component; system persistent storage separate from the heat-generating component to be cooled, the persistent storage including system thermal control parameter information stored thereon, the system thermal control parameter information defining a permissible range of values for the at least one component thermal control parameter; and at least one processing device separate from the heat generating component that is coupled to receive values of real time sensed component temperature from the temperature sensor, and to provide control signals to control a fan speed of each of the cooling fans to cool the heat-generating component and/or to control power consumption of the heat-generating component.

In one embodiment of such a first additional respect, the processing device may be coupled to retrieve the at least one component thermal control parameter stored in the memory of the heat-generating component, and may be further coupled to retrieve the system thermal control parameter information including the permissible range of values for the at least one component thermal control parameter from the system persistent storage. In a further embodiment of such a system, the processing device may be further configured to compare the retrieved component thermal control parameter to the defined permissible range of values for the component thermal control parameter to determine if the retrieved component thermal control parameter has a value within the defined permissible range of values for the component thermal control parameter, and to: use the retrieved component thermal control parameter to control cooling fan speed of one or more of the cooling devices and/or control power consumption of the heat-generation component if the retrieved component thermal control parameter is determined to be within the defined permissible range of values for the component thermal control parameter, or use the maximum value of the defined permissible range of values for the component thermal control parameter to control cooling fan speed of one or more of the cooling devices and/or control power consumption of the heat-generation component if the retrieved component thermal control parameter is determined to be greater than the defined permissible range of values for the component thermal control parameter, or use the minimum value of the defined permissible range of values for the component thermal control parameter to control cooling fan speed of one or more of the cooling devices and/or control power consumption of the heat-generation component if the retrieved component thermal control parameter is determined to be less than the defined permissible range of values for the component thermal control parameter.

In a further embodiment of such a first additional respect, the retrieved component thermal control parameter may be a retrieved component fan control target setpoint temperature, and the defined permissible range of values for the component thermal control parameter may be a permissible range of values of component fan control target setpoint temperature. In such an embodiment, the processing device may be configured to compare the retrieved component fan control target setpoint temperature to the permissible range of values of component fan control target setpoint temperature to determine if the retrieved component fan control target setpoint temperature has a value within the defined permissible range of values of component fan control target setpoint temperature, and to: use the retrieved component fan control target setpoint temperature value as a selected component fan control target setpoint temperature value to control cooling fan speed of one or more of the cooling devices if the retrieved component fan control target setpoint temperature is determined to be within the defined permissible range of values of component fan control target setpoint temperature, or use the maximum value of the defined permissible range of values of component fan control target setpoint temperature as a selected component fan control target setpoint temperature value to control cooling fan speed of one or more of the cooling devices if the retrieved component fan control target setpoint temperature is determined to be greater than the defined permissible range of values of component fan control target setpoint temperature, or use the minimum value of the defined permissible range of values of component fan control target setpoint temperature as a selected component fan control target setpoint temperature value to control cooling fan speed of one or more of the cooling devices if the retrieved component fan control target setpoint temperature is determined to be less than the defined permissible range of values of component fan control target setpoint temperature.

In a further embodiment of such a first additional respect, the processing device may be configured to determine a value of a system fan control target setpoint temperature by subtracting an offset value from the selected component fan control target setpoint temperature value, and to control cooling fan speed of one or more of the cooling devices based on the determined system fan control target setpoint temperature and the real time current sensed component temperature. Additionally, the at least one heat-generating component may in one embodiment be a central processing unit (CPU), and the at least one processing device that is separate from the heat-generating component may be an out-of-band processing device.

In another and second additional respect, disclosed herein is an adaptive method for controlling cooling fan response in an information handling system, including: operating at least one heat-generating component that consumes electrical power within an information handling system chassis enclosure, the heat-generating component including memory storing at least one component thermal control parameter that includes at least one of a component thermal throttling temperature threshold value or a component fan control target setpoint temperature value; using one or more variable speed cooling fans to provide different flow rates of cooling air within the chassis enclosure to cool the heat generating component; using at least one temperature sensor to sense an operating temperature of the heat generating component in real time; using at least one processing device separate from the heat generating component to: retrieve the component thermal control parameter value stored in the memory of the heat-generating component, and receive values of real time sensed component operating temperature from the temperature sensor; using at least one processing device separate from the heat generating component to compare the retrieved component thermal control parameter to a defined permissible range of values for the component thermal control parameter to determine if the retrieved component thermal control parameter has a value within the defined permissible range of values for the component thermal control parameter, and to: use the retrieved component thermal control parameter to control cooling fan speed of one or more of the cooling devices and/or control power consumption of the heat-generation component if the retrieved component thermal control parameter is determined to be within the defined permissible range of values for the component thermal control parameter, or use the maximum value of the defined permissible range of values for the component thermal control parameter to control cooling fan speed of one or more of the cooling devices and/or control power consumption of the heat-generation component if the retrieved component thermal control parameter is determined to be greater than the defined permissible range of values for the component thermal control parameter, or use the minimum value of the defined permissible range of values for the component thermal control parameter to control cooling fan speed of one or more of the cooling devices and/or control power consumption of the heat-generation component if the retrieved component thermal control parameter is determined to be less than the defined permissible range of values for the component thermal control parameter.

In one embodiment of such a second additional respect, the retrieved component thermal control parameter may be a retrieved component fan control target setpoint temperature; the defined permissible range of values for the component thermal control parameter may be a permissible range of values of component fan control target setpoint temperature; and the method may further include: using the processing device to compare the retrieved component fan control target setpoint temperature to the permissible range of values of component fan control target setpoint temperature to determine if the retrieved component fan control target setpoint temperature has a value within the defined permissible range of values of component fan control target setpoint temperature, and using the processing device to: use the retrieved component fan control target setpoint temperature value as a selected component fan control target setpoint temperature value to control cooling fan speed of one or more of the cooling devices if the retrieved component fan control target setpoint temperature may be determined to be within the defined permissible range of values of component fan control target setpoint temperature, or use the maximum value of the defined permissible range of values of component fan control target setpoint temperature as a selected component fan control target setpoint temperature value to control cooling fan speed of one or more of the cooling devices if the retrieved component fan control target setpoint temperature may be determined to be greater than the defined permissible range of values of component fan control target setpoint temperature, or use the minimum value of the defined permissible range of values of component fan control target setpoint temperature as a selected component fan control target setpoint temperature value to control cooling fan speed of one or more of the cooling devices if the retrieved component fan control target setpoint temperature may be determined to be less than the defined permissible range of values of component fan control target setpoint temperature.

In a further embodiment of such a second additional respect, the method may further include using the processing device to: determine a value of a system fan control target setpoint temperature by subtracting an offset value from the selected component fan control target setpoint temperature value; and to control cooling fan speed of one or more of the cooling devices based on the determined system fan control target setpoint temperature and the real time current sensed component temperature. Additionally, in one embodiment, the at least one heat-generating component may be a central processing unit (CPU), and the at least one processing device that may be separate from the heat-generating component may be an out-of-band processing device.

In another and third additional respect, disclosed herein is an information handling system, including: a chassis enclosure; at least one heat-generating component to be cooled that may be contained within the chassis enclosure that consumes electrical power for operation, the heat-generating component including memory storing a component thermal throttling temperature threshold value and a component thermal profile that may be specified as a relationship between component operating temperature and component operating power that may be limited at an upper value by the component thermal throttling temperature threshold value; at least one temperature sensor configured to sense and report an operating temperature of the heat generating component; one or more variable speed cooling fans configured to provide different flow rates of cooling air within the chassis enclosure to cool the heat generating component; system persistent storage separate from the heat-generating component to be cooled, the persistent storage including system thermal control parameter information stored thereon, the system thermal control parameter information including a system maximum component thermal profile value; and at least one processing device separate from the heat generating component that may be coupled to receive values of real time sensed component temperature from the temperature sensor, to receive values of real time component power consumption from the heat-generating component, and to provide control signals to control a fan speed of each of the cooling fans to cool the heat-generating component.

In one embodiment of such a third additional respect, the processing device may be coupled to retrieve the component thermal throttling temperature threshold value and the fan control target setpoint temperature profile stored in the memory of the heat-generating component, and may be further coupled to retrieve the system maximum component thermal profile value from the system persistent storage. In a further embodiment of such a third additional respect, the processing device may be configured to: use the component thermal profile to determine a component fan control target setpoint temperature value as a function of received real time current component power consumption and use the determined component fan control target setpoint temperature value as a selected component fan control target setpoint temperature value to control cooling fan speed of one or more of the cooling devices if the determined component fan control target setpoint temperature value may be less than or equal to the system maximum component thermal profile value, or use the system maximum component thermal profile value as a selected component fan control target setpoint temperature value to control cooling fan speed of one or more of the cooling devices if the determined component fan control target setpoint temperature value may be greater than the system maximum component thermal profile value.

In a further embodiment of such a third additional respect, the processing device may be configured to determine a value of a system fan control target setpoint temperature by subtracting an offset value from the selected component fan control target setpoint temperature value, and to control cooling fan speed of one or more of the cooling devices based on the determined system fan control target setpoint temperature and the real time current sensed component temperature. Additionally, the at least one heat-generating component may be a central processing unit (CPU), and where the at least one processing device that may be separate from the heat-generating component may be an out-of-band processing device.

In another and fourth additional respect, disclosed herein is an adaptive method for controlling cooling fan response in an information handling system, including: operating at least one heat-generating component that consumes electrical power within an information handling system chassis enclosure, the heat-generating component including memory storing at least one component thermal control parameter that includes a component thermal throttling temperature threshold value and a component thermal profile that may be specified as a relationship between component operating temperature and component operating power that may be limited at an upper value by the component thermal throttling temperature threshold value; using one or more variable speed cooling fans to provide different flow rates of cooling air within the chassis enclosure to cool the heat generating component; using at least one temperature sensor to sense an operating temperature of the heat generating component in real time; using at least one processing device separate from the heat generating component to: retrieve the component thermal throttling temperature threshold value and the component thermal profile stored in the memory of the heat-generating component, and receive values of real time sensed component temperature from the temperature sensor, and to receive values of real time component power consumption from the heat-generating component; and using at least one processing device separate from the heat generating component to: use the component thermal profile to determine a component fan control target setpoint temperature value as a function of received real time current component power consumption, and use the determined component fan control target setpoint temperature value as a selected component fan control target setpoint temperature value to control cooling fan speed of one or more of the cooling devices if the determined component fan control target setpoint temperature value may be less than or equal to a system maximum component thermal profile value that itself may be set less than the component thermal throttling temperature threshold value, or use the system maximum component thermal profile value as a selected component fan control target setpoint temperature value to control cooling fan speed of one or more of the cooling devices if the determined component fan control target setpoint temperature value may be greater than the system maximum component thermal profile value.

In one embodiment of such a third additional respect, the method may further include using the processing device to determine a value of a system fan control target setpoint temperature by subtracting an offset value from the selected component fan control target setpoint temperature value, and to control cooling fan speed of one or more of the cooling devices based on the determined system fan control target setpoint temperature and the real time current sensed component temperature. Additionally, the at least one heat-generating component may be a central processing unit (CPU), and the at least one processing device that may be separate from the heat-generating component may be an out-of-band processing device.

DESCRIPTION OF ILLUSTRATIVE EMBODIMENTS

Figure 5:
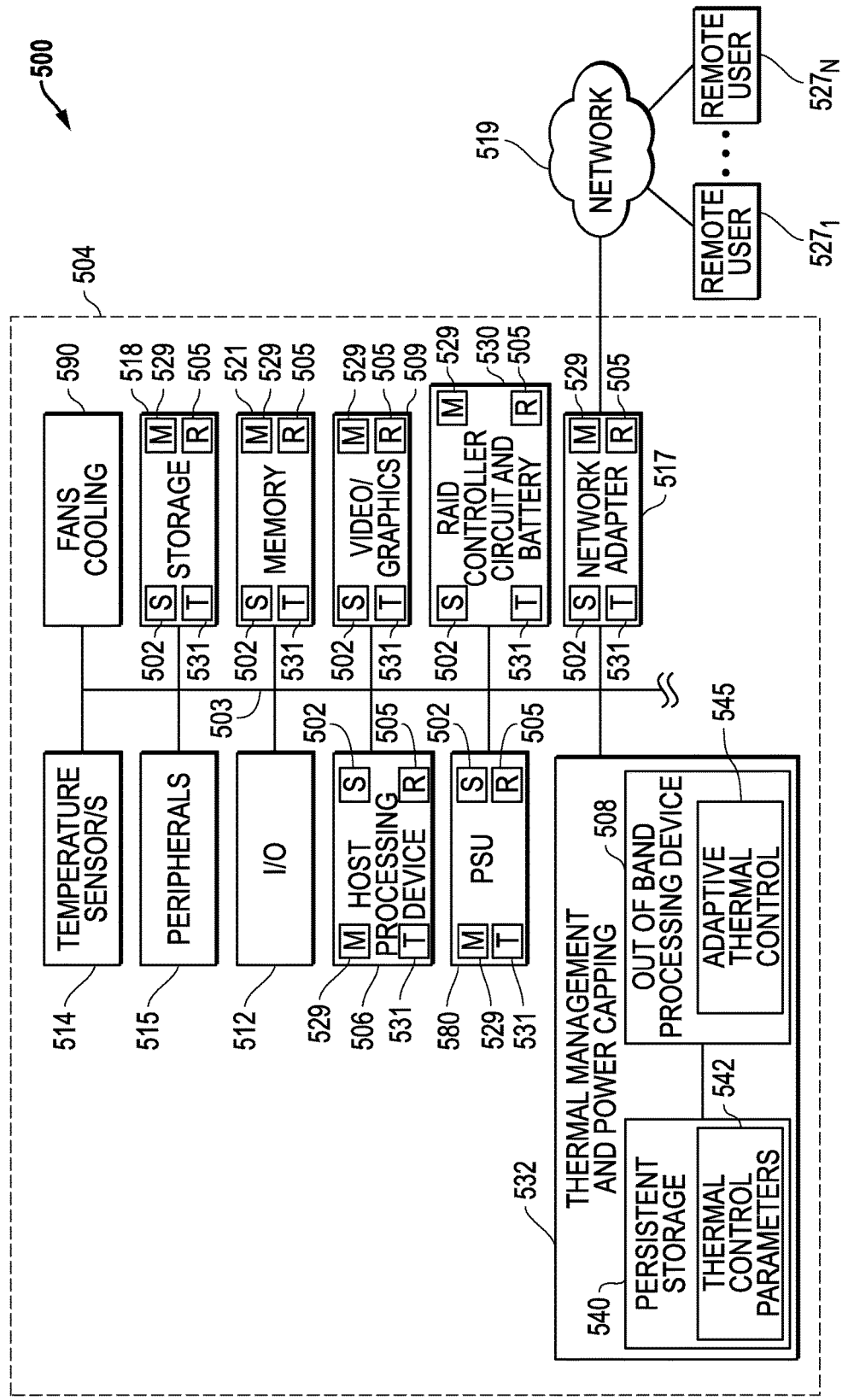
FIG. 5 is a block diagram illustrating an information handling system platform according to one exemplary embodiment of the disclosed systems and methods.

FIG. 5 illustrates one exemplary embodiment of an information handling system platform 500, configured in this embodiment as a server platform. As shown, system platform 500 includes heat-producing electrical components and one or more cooling fans 590 configured to cool the heat-producing components. The heat-producing components may be contained within an enclosure 504 (e.g., such as a 2U, 3U, 4U, etc. computer chassis) and cooled by the one or more cooling fan/s 590 in a manner as described below. Examples of heat-producing components illustrated in the embodiment of FIG. 5 include one or more in-band host processing devices 506 (e.g., CPU executing host operating system), video/graphics hardware (e.g., video card/s) 509, storage (e.g., one or more HDDs) 518, memory (e.g., RAM) 521, RAID controller 530, network adapter 517 and system power supply PSU 580, although other types and combinations of heat-producing components are possible. Additional components that may be present in the embodiment of FIG. 5 include, but are not limited to, input/output (I/O) 512 and peripherals 515.

In the illustrated embodiment of FIG. 5, optional discrete temperature sensor/s 514 may be present to sense and report the internal ambient operating temperature within enclosure 504. As shown, one or more buses or other suitable communication media 503 may be provided for allowing communication of data and other information between the various components of system platform 500. Also shown present in FIG. 5 is out-of-band processing device 508 (e.g., (e.g., BMC, service processor, embedded processor, remote access controller, etc.) coupled to persistent storage 540. Together, out of band processing device 508 and persistent storage 540 (e.g., BMC non-volatile memory) may be configured as thermal management and power capping 532 to implement adaptive thermal control on a closed loop basis based on one or more real time measured hardware component temperatures, e.g., such as real time temperature of CPU 506. A network adapter 517 may be present as shown to provide communication between components of server platform 500 to remote user/s 527 via network (e.g., Internet) 519. Moreover, out of band processing device 508 may be configured to control operation of CPU 506 to reduce of throttle the power consumption of CPU 506.

It will be understood that system platform 500 illustrated in FIG. 5 is exemplary only, and that the disclosed thermal control systems and methods may be implemented with any other information handling system embodiments that include one or more heat-producing electrical components and one or more cooling fans. Further, although one particular exemplary embodiment of an out-of-band processing device 508 is illustrated in FIG. 5, the disclosed systems and methods may be implemented in other embodiments using any other type and/or combination of out-of-band processing devices and/or in-band processing devices (e.g., such as host processing device 506) that is suitable for implementing one or more features of the disclosed systems and methods as described herein. It will also be understood that an out-of-band processing device is a processing device separate and independent from any in-band host central processing unit (CPU) such as host processing device 506 that runs the host OS of an information handling system platform 500, and without management of any application executing with a host OS on the host processing device 506.

As further shown in FIG. 5, one or more heat-producing components of an information handling system platform 500 may be provided with a respective thermal sensing circuitry or sensor/s 502 that is configured to sense the real time temperature of its corresponding hardware component and then to report this sensed temperature to out of band processing device 508 across communication media 503, e.g., at predetermined time intervals that may be unique for each component. One or more optional chassis temperature sensors 504 may also be provided as shown for monitoring internal chassis temperatures at one or more different chassis locations, e.g., such as ambient temperature at the air inlet of the chassis 504. Non-volatile persistent storage 540 may be coupled to out of band processing device 508, and may contain thermal control parameters 542 that are accessible by out of band processing device 508. As described further herein, out of band processing device 508 may execute adaptive thermal control logic 545 to control operation of cooling fan/s 590 based on adaptive thermal control parameters 542 from persistent storage 540 and measured temperature information received from sensors 502.

For purposes of illustration herein, the disclosed adaptive thermal control systems and methods will be described with reference to the exemplary embodiment of FIG. 5 as it may be implemented to use cooling fans 590 to cool a CPU 506 having digital thermal sensing circuitry or sensor/s 502 that reports real time temperature of the processor die of CPU 506 to out of band processing device 508 across communication media 503, e.g., as an offset value relative to an activation temperature of thermal throttling control of the CPU 506. In this embodiment, CPU 506 also includes memory register/s 505 that contain hard-coded CPU component thermal control parameter/setpoint values set by the CPU manufacturer and that are accessible retrievable by out of band processing device 508 from CPU registers 505. However, it will be understood that the disclosed systems and methods may implemented adaptive thermal control based on real time reported component temperature received across communication media 503 from respective sensor/s 502 of any one or more of the other heat-producing components of information handling system 500, and/or based on real time internal ambient temperature of chassis enclosure 504 as sensed by discrete temperature sensor/s 514 and reported to out of band processing device 508 across communication media 503.

Moreover, as further illustrated in FIG. 5, other types of heat-producing components of information handling system 500 may optionally include memory register/s 505 that contain hard-coded component thermal control parameter/setpoint values set by the component manufacturer in a manner similar to that for CPU 506. In such an alternative embodiment, hard-coded component thermal control parameter/setpoint values may be retrievable by out of band processing device 508 from memory register/s 505 of a non-CPU heat-producing component, e.g., in order to implement adaptive thermal control based on real time component temperatures and component thermal parameters/set point values retrieved from the non-CPU component in a manner/s similar to that employed with CPU 506.

FIGS. 6A to 9 illustrate component operating temperature for the die of CPU 506 as a function of time for different exemplary embodiments of adaptive thermal control and will be described as being implemented by components of the server platform embodiment 500 of FIG. 5, e.g., using closed loop thermal control techniques. It will be understood however that the disclosed systems and methods may be implemented using other information handling system configurations having different combinations of heat-producing components, cooling fans and one or more processing device/s. Referring now to FIG. 5, in each of the embodiments of FIGS. 6A-9, adaptive thermal control logic 545 of out-of-band processing device 508 is used to control speed of cooling fans 590 in a closed loop manner and in real time based on sensed changes in operating temperature of CPU component 506 as reported by the CPU's component digital thermal sensing circuitry or sensor/s 502 (e.g., as an offset value reported relative to a thermal throttling temperature threshold stored in CPU register/s 505) to out-of-band processing device 508.

In FIGS. 6A-9, the component thermal throttling temperature threshold (e.g., such as CPU thermal throttling temperature threshold) is a component power capping threshold temperature value maintained in register 505 of CPU device 506 or other type of heat-producing component that represents a component temperature threshold set by the component manufacturer and above which the component provides a critical temperature warning and component thermal throttling control 531 is activated by a thermal monitor 529 of the component to reduce the component (e.g., CPU die) temperature, e.g., in the case of CPU 506 using clock modulation and/or by throttling down the CPU clock speed and operating input voltage until the sensed CPU temperature drops again drops below the maximum component temperature. A separate component fan control target setpoint temperature value in the form of a component fan control target temperature setpoint temperature value (e.g., such as CPU fan control target setpoint temperature value) is a static value maintained in register 505 of CPU 506 or other type of heat-producing component and is set by the component manufacturer below the component thermal throttling temperature threshold as a target component (e.g., CPU die) operating temperature. It will be understood that the embodiments of each of FIGS. 6A-9 may be similarly implemented for other types of heat-producing components (such as any of components 580, 518, 521, 509 and/or 530 of FIG. 5), in which case, such other types of non-CPU heat-producing components of information handling system 500 may optionally include one or more processing devices together with a thermal monitor 529 that is configured to activate thermal throttling control 531 for the individual component, and a component thermal throttling temperature threshold value may be maintained in register 505 of the individual component that represents a component temperature threshold set by the component manufacturer and above which the component may provide a critical temperature warning and/or component thermal throttling control 531 may be activated by the component thermal monitor 529 to reduce the component temperature in a manner similar to that described for CPU 506.

Figure 3:
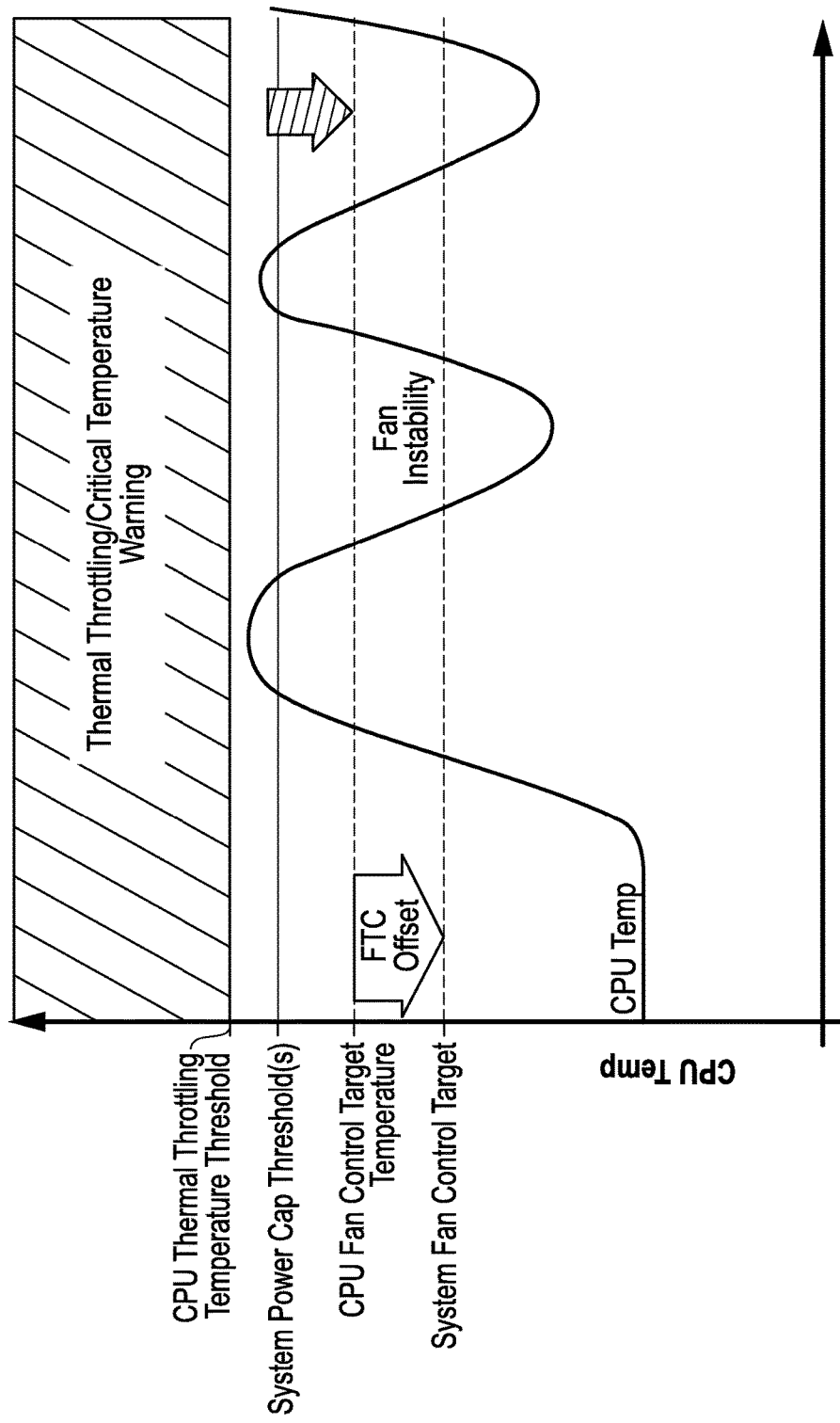
FIG. 3 illustrates CPU die operating temperature as a function of time according to conventional thermal control setpoint methodology.
Figure 4:
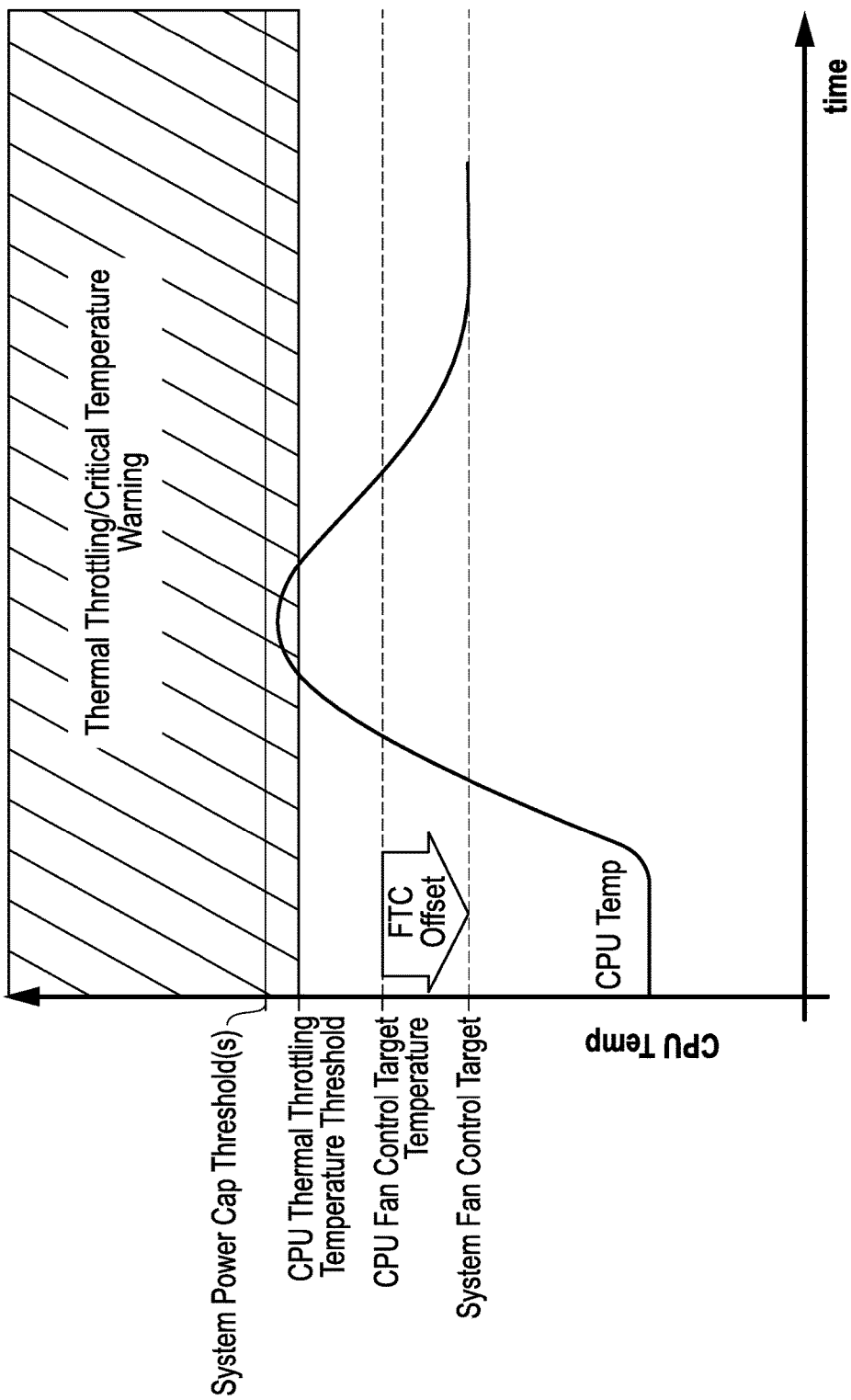
FIG. 4 illustrates CPU die operating temperature as a function of time according to conventional thermal control setpoint methodology.
Figure 6A:
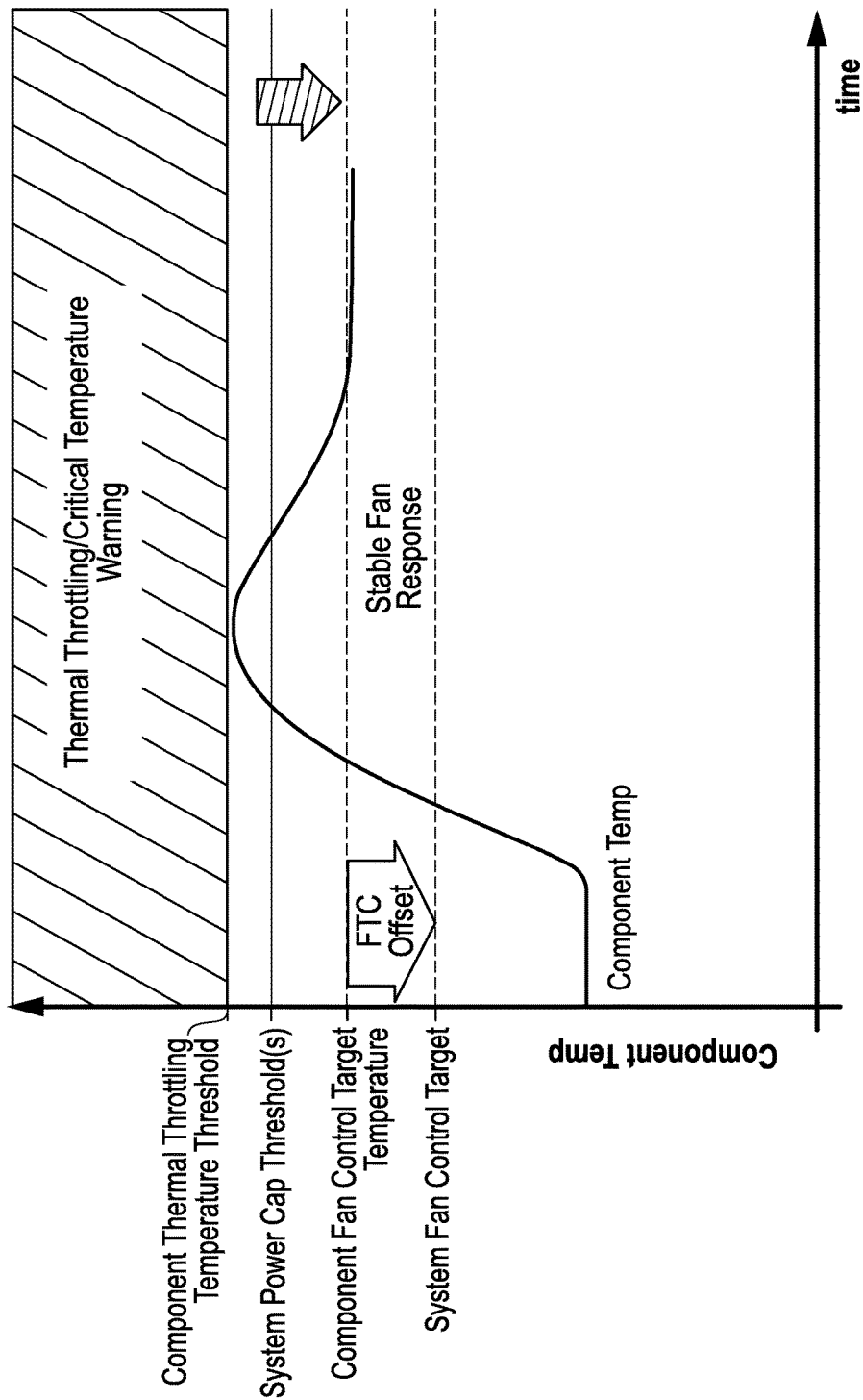
FIG. 6A illustrates component temperature as a function of time according to one exemplary embodiment of the disclosed systems and methods.

FIG. 6A illustrates an exemplary embodiment in which closed loop controller gains or tuning parameters are scaled by adaptive thermal control logic 545 executing on out-of-band processing device 508 as a function of changes in component fan control target setpoint temperature values (e.g., in this example CPU fan control target temperature setpoint values) stored in register 505 of a given CPU device 506 so as to compensate cooling fan response for more or less aggressive cooling fan response requirements. As shown, in FIG. 6A, adaptive thermal control 545 may implement a closed loop process control algorithm or controller using the scaled controller gains to achieve a stable fan response even though component fan control target temperature setpoint value for CPU 506 has been lowered or made more stringent for the given CPU device 506 (as represented by the downward pointing cross-hatched arrow). This is in contrast to the fan instability typically experienced under the same conditions when employing conventional thermal control methodology as illustrated in FIG. 3.

Examples of controller gain parameters/tuning parameters that may be so scaled include, but are not limited to, proportional-integral-derivative (PID) controller gains, i.e., proportional gain ($K_p$), integral gain ($K_i$), and derivative gain (Kd), which may be used in any combination (e.g., P, PI, PID, etc.) to generate the cooling fan controller output u(t) or manipulated variable (MV) that may be used as a pulse width modulation (PWM) control signal that varies based on real time CPU temperature provided from digital thermal sensing circuitry 502 of CPU 506. The resulting PWM control signal may be used to control the cooling fan speed, e.g., in a manner such as described in U.S. patent application Ser. No. 13/559,031 filed Jul. 26, 2012 and in U.S. patent application Ser. No. 14/154,840 filed Jan. 14, 2014, each of which are incorporated herein by reference in its entirety for all purposes. Besides PWM, it will be understood that any other suitable type of control signal may be employed to control cooling fan speed and/or power capping operations.

For example, in one exemplary embodiment a cooling fan controller implemented by adaptive thermal control 545 may utilize all three PID gains in the following relationship of Equation 1 to control cooling fan speed over time (t) based on setpoint (SP)=component fan control target temperature, and real time component temperature (PV) reported by component digital thermal sensing circuitry (e.g., sensor/s 502 of CPU 506 or other heat-producing component) at any given instantaneous time (t):

$$u(t) = MV(t) = K_p e(t) + K_i \int_0^t e(\tau)d\tau + K_d \frac{d}{dt}e(t) \quad \text{(Equation 1)}$$

where: τ=variable of integration having values from time 0 to the present t;
e=error=set point (SP)−measured value (PV).

Figure 6B:
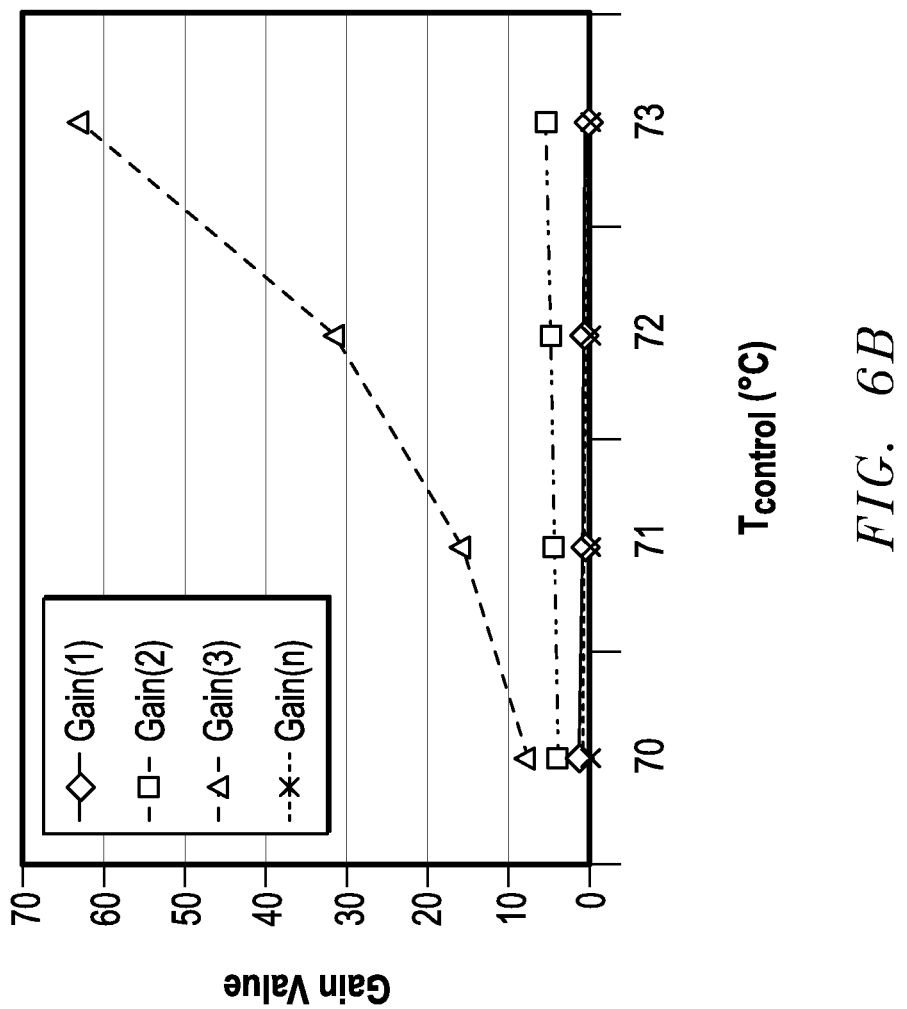
FIG. 6B illustrates closed loop controller gain values as a function of component fan control target temperature setpoint value according to one exemplary embodiment of the disclosed systems and methods.

In one embodiment, scalable closed loop controller gains/tuning parameters may be stored in, and read from, a lookup table maintained in thermal control parameters 542 of persistent storage 540 of FIG. 5. Table 1 below is an example of such a lookup table format for storing multiple scalable controller gain values Gain(1) to Gain(n) as a function of specified component fan control target temperature setpoint value read from register 505 of a given CPU device 506, e.g., Gain(1) may be $K_p$, Gain(2) may be $K_i$, Gain(3) may be Kd, etc. In this embodiment, the values of each of the controller gains (e.g., Gain(1), Gain(2), Gain(3), etc.) may be increased to provide a faster response to more stringent cooling requirements (e.g., decreased component fan control target temperature setpoint value in one embodiment) as illustrated in FIG. 6B, or may be decreased to provide a slower response to less stringent or relaxed cooling requirements (e.g., increased component fan control target temperature setpoint value in one embodiment). However, values of controller gains may vary in any other desired or suitable manner with changing component fan control target setpoint temperature values.

TABLE 1

Lookup Table Example

| | Component fan control target | | | |
|---|---|---|---|---|
| | 70° C. | 71° C. | 72° C. | 73° C. |
| Gain(1) | 1.0 | 0.8 | 0.6 | 0.4 |
| Gain(2) | 4.0 | 4.5 | 5. | 5.5 |
| Gain(3) | 8.0 | 16.0 | 32.0 | 64.0 |
| Gain(n) | 0.1 | 0.2 | 0.3 | 0.4 |

In another exemplary embodiment, scalable closed loop controller gains/tuning parameters may be calculated from one or more equations stored in, and read from, thermal control parameters 542 of persistent storage 540 of FIG. 5. Table 2 below is an example of a set of equations for generating multiple respective scalable controller gain values Gain(1) to Gain(n) as a function of a variable "x" that represents the specified component fan control target temperature setpoint value (e.g., 70° C., 71° C., 72° C., 73° C., etc.) read from register 505 of a given CPU device 506. Once again, in one exemplary embodiment Gain(1) may be $K_p$, Gain(2) may be $K_i$, Gain(3) may be Kd, etc.

TABLE 2

Equation Example

| | Component fan control target | | | |
|---|---|---|---|---|
| | 70° C. | 71° C. | 72° C. | 73° C. |
| Gain(1) | | =m*x + b | | |
| Gain(2) | | =a*EXP(b*x) | | |
| Gain(3) | | =a*x² + b*x + c | | |
| Gain(n) | | =f(x) | | |

In each of the embodiments of Tables 1 and 2, component fan control target temperature is expressed as a component spec value (e.g., read from register 505 of a CPU device 506) that is expressed in values of absolute temperature (° C.), it being understood that similar methodology may be employed for other types of heat-producing components besides CPU 506. However, it will be understood that component fan control target temperature for a given information handling system component (such as CPU device 506 or other type of heat-producing component) may be alternatively expressed as a component spec using any other suitable type of temperature-indicative value, for example, as an offset value from specified maximum component temperature or component thermal throttling temperature threshold value.

In one embodiment, cooling fan speed may be controlled using a closed loop process control algorithm (e.g., P, PI, PID, etc.) implemented by adaptive thermal control 545 of processing device 508 based on either of a system fan control target setpoint temperature (e.g., determined as an offset from a component fan control target setpoint value as shown in FIG. 6), or alternatively based on a component fan control target setpoint value itself as received from an individual heat-generating component such as CPU 506 or other heat-producing components of FIG. 5. In either case, such a closed loop process control algorithm may be implemented using scalable closed loop controller gains/tuning parameters that are determined based on a retrieved value of component fan control target setpoint temperature in a manner such as illustrated and described above in relation to FIGS. 6A-6B and Tables 1 and 2. Alternatively, it will be understood that in other embodiments described and illustrated herein, fixed non-scaled controller gains (e.g., P, PI, PID, etc.) may be employed in closed loop process control algorithms to control cooling fan speed based on system and/or component fan control target setpoint temperatures, e.g., using the above described relationship of Equation 1 or using any other suitable closed loop control relationship known in the art together with the fixed gain values to control cooling fan speed to control component (e.g., CPU) operating temperature to be the setpoint temperature.

Figure 7:
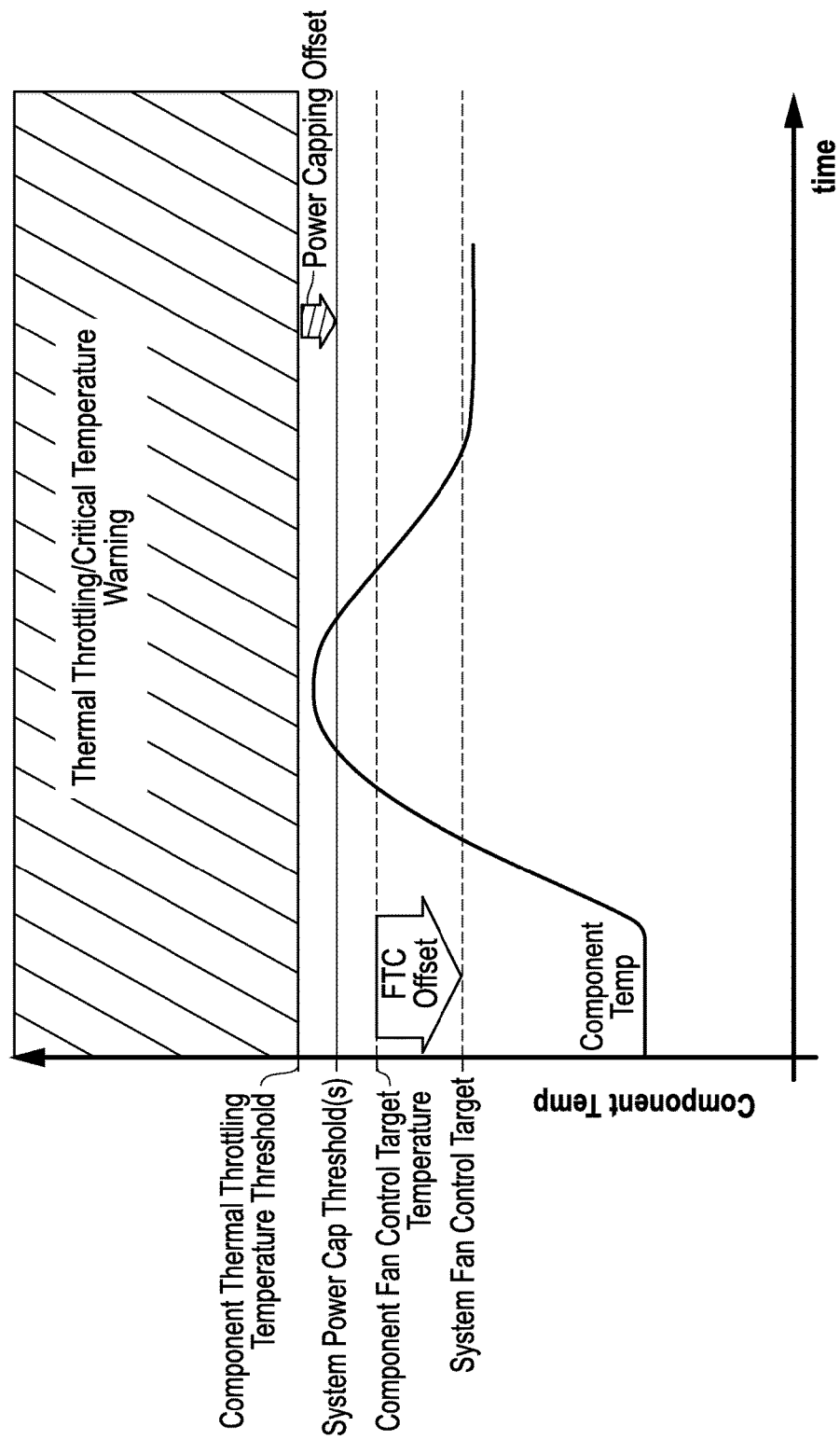
FIG. 7 illustrates component temperature as a function of time according to one exemplary embodiment of the disclosed systems and methods.

FIG. 7 illustrates another exemplary embodiment in which system power capping threshold temperature as set by a system manufacturer may be automatically scaled, e.g., as an offset value or function (e.g., fixed offset value, ratio, non-linear or quadratic function, functions listed in Table 2 herein, etc.) relative to the component manufacturer maximum component temperature or component thermal throttling temperature threshold value read from register 505 of a given heat-producing component such as CPU device 506, and in a manner such that the system manufacturer power capping threshold temperature value is decreased when the component thermal throttling temperature threshold value for a given CPU device or other type of heat-producing component is decreased, and is increased when the component thermal throttling temperature threshold value for a given CPU device or other type of heat-producing component is increased. In this embodiment, system power capping threshold values are no longer static, and specific different fixed values of system manufacturer power capping threshold temperature for each CPU bin are not required to be stored in BMC accessible memory as is required with conventional thermal control methodology. Rather, a power capping threshold scaling value (e.g., power capping offset function or value in degrees or other temperature-representative value) may be stored in thermal control parameters 542 of persistent storage 540, and then read by adaptive thermal control logic 545 of out-of-band processing device 508.

In the embodiment of FIG. 7, out-of-band processing device 508 may also read the particular component thermal throttling temperature threshold value from the register 505 of a given CPU device 506 or other type of heat-producing component, and apply the power capping threshold scaling value to automatically scale the power capping threshold value up and down together with changes to the component thermal throttling temperature threshold value (e.g., as a fixed offset below the component thermal throttling temperature threshold value) as illustrated by the arrow in FIG. 7. In this case, system manufacturer power capping threshold value is always set relative (e.g., as a fixed offset) to the particular component thermal throttling temperature threshold value of a given CPU device or other type of heat-producing component included in the current system, even if it is different from other CPU devices or other type of heat-producing components employed in other systems. Thus, for example, if component thermal throttling temperature threshold value of a given CPU device 506 has changed from that specified for previous CPU devices 506, the power capping offset definition automatically updates the system manufacturer power capping threshold temperature to a new value based on the magnitude of the new component thermal throttling temperature threshold value. This results in a different custom system manufacturer power capping threshold value being set for each CPU device 506 that is provided with a different component thermal throttling temperature threshold value than other CPU devices 506, and in similar fashion with regard to other types of system heat-producing devices.

Figure 1:
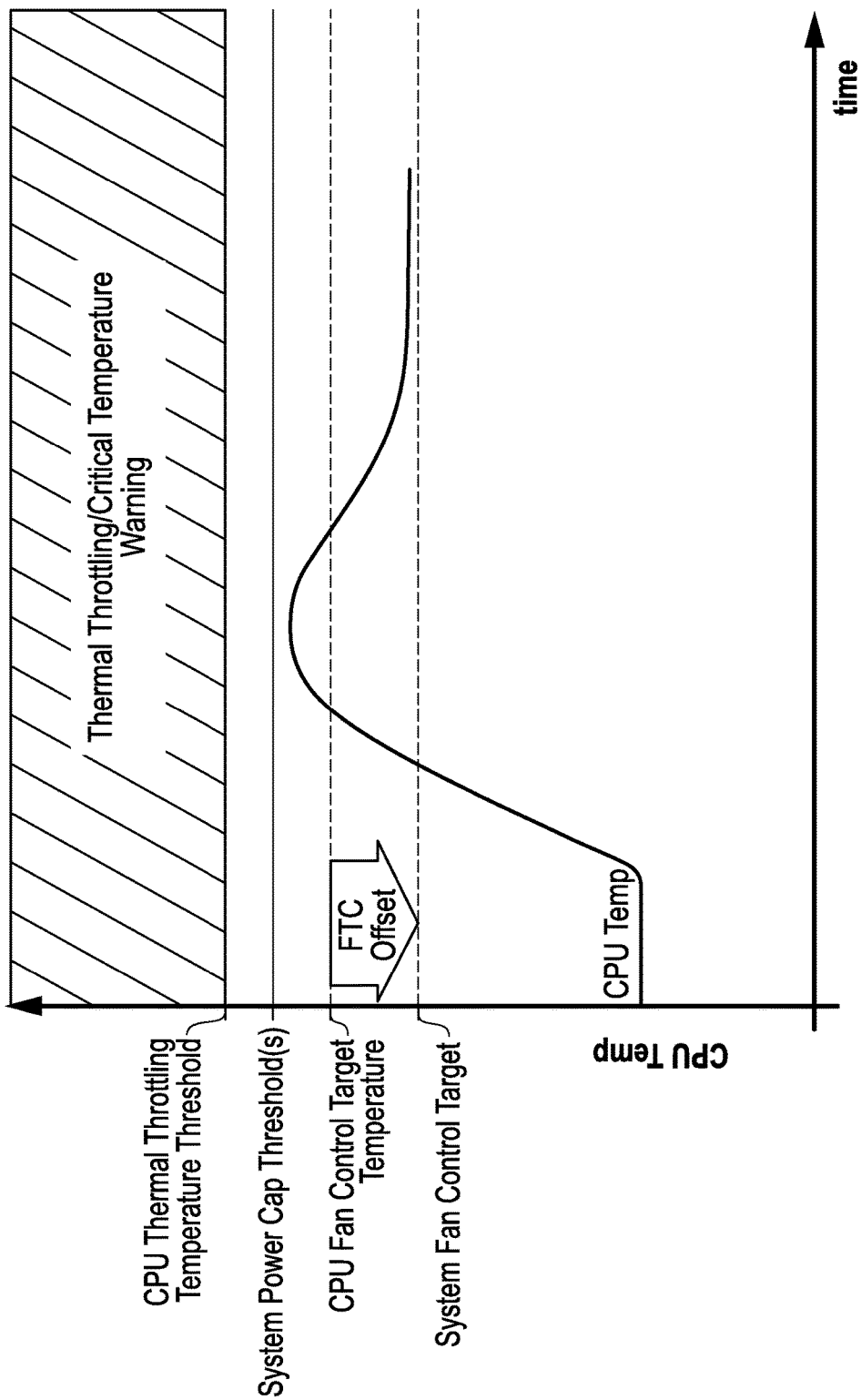
FIG. 1 illustrates CPU die operating temperature as a function of time according to conventional thermal control setpoint methodology.
Figure 2:
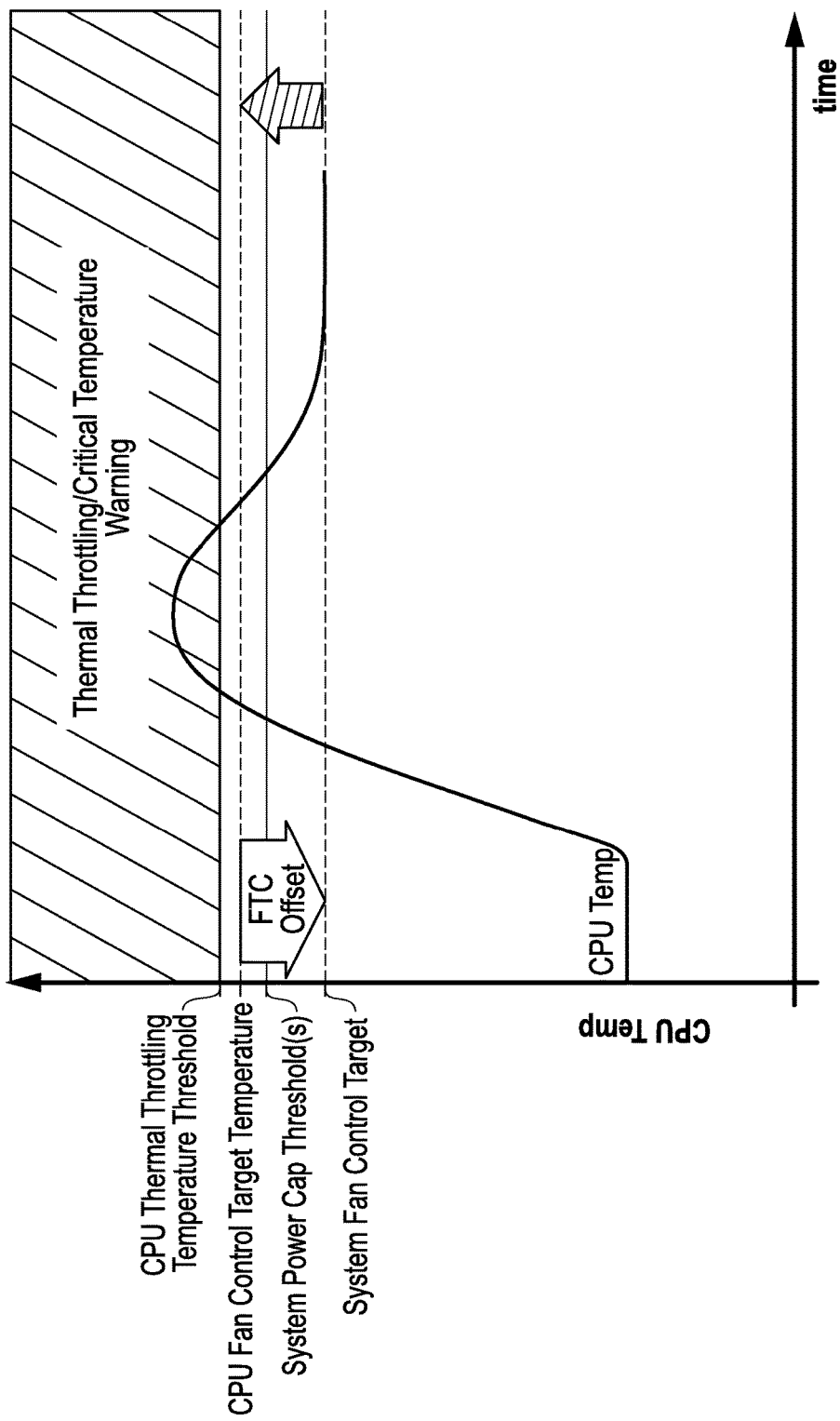
FIG. 2 illustrates CPU die operating temperature as a function of time according to conventional thermal control setpoint methodology.
Figure 8:
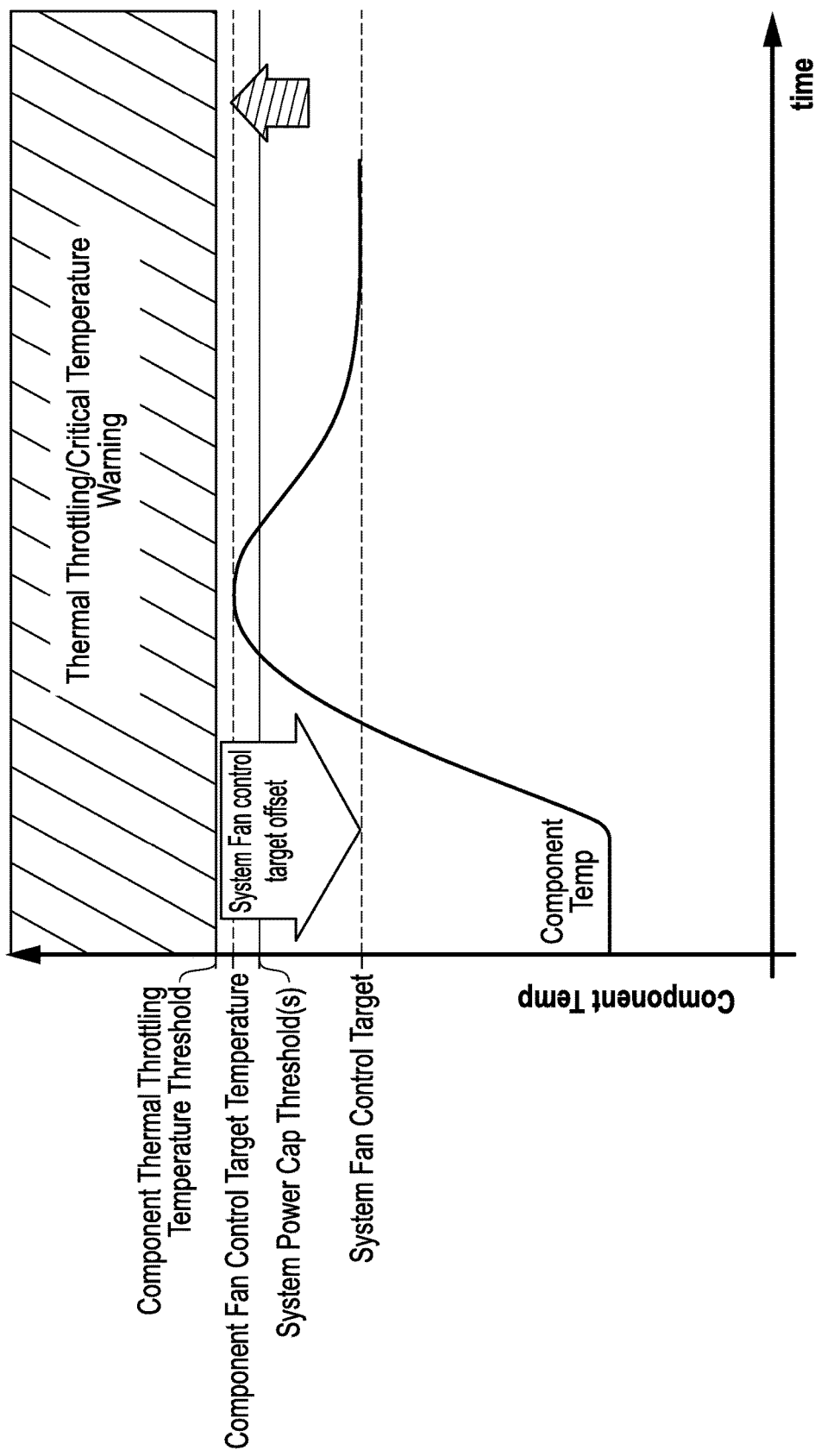
FIG. 8 illustrates component temperature as a function of time according to one exemplary embodiment of the disclosed systems and methods.

FIG. 8 illustrates another exemplary embodiment in which system manufacturer system fan control target setpoint temperature value is automatically set as an offset or function (e.g., fixed offset value, ratio, non-linear or quadratic function, functions listed in Table 2 herein, etc.) relative to the component thermal throttling temperature threshold value read from register 505 of a given CPU device 506 or other system heat-producing component, such that the system manufacturer system fan control target setpoint temperature value is decreased when the component thermal throttling temperature threshold value for a given heat-producing component is decreased, and is increased when the component thermal throttling temperature threshold value for a given heat-producing component is increased. This is in contrast to conventional thermal control methodology in which system manufacturer system fan control target setpoint temperature value is set as an offset from the CPU fan control target temperature setpoint value read from register 505 of a CPU device 506 as described in relation to FIG. 2. Thus, in the embodiment of FIG. 8, even when the component fan control target temperature setpoint value is relaxed (or increased) for a given heat-producing component (e.g., CPU device) by the component manufacturer relative to the component thermal throttling temperature threshold value as illustrated by the upward pointing cross-hatched arrow in FIG. 8, the system manufacturer system fan control target setpoint temperature does not increase or otherwise change relative to the component thermal throttling temperature threshold value of the given CPU device as illustrated by the downward arrow representing the offset in FIG. 8. This prevents the undesired activation of component throttling/critical temperature warning effects from occurring as is the case in the conventional thermal control of FIG. 2.

In a further exemplary embodiment, the system manufacturer system fan control target setpoint temperature value may be automatically set as an offset or function relative to the component thermal throttling temperature threshold value that is associated with a level of temperature overshoot expected for a specific information handling system platform configuration (e.g., the level of temperature overshoot may be characterized during system development or estimated based on simulation).

In the embodiment of FIG. 8, an offset value or function for so scaling the system manufacturer system fan control target setpoint temperature value may be stored in thermal control parameters 542 of persistent storage 540, and then read by adaptive thermal control logic 545 of out-of-band processing device 508. Out-of-band processing device 508 may also read the particular component thermal throttling temperature threshold value from the register 505 of a given CPU device 506 or other heat-producing component and apply the system manufacturer system fan control target setpoint scaling value or function to automatically set the system manufacturer system fan control target setpoint temperature value based on the component thermal throttling temperature threshold value as illustrated by the downward arrow in FIG. 8, regardless of any change in the component fan control target temperature setpoint value.

Figure 9:
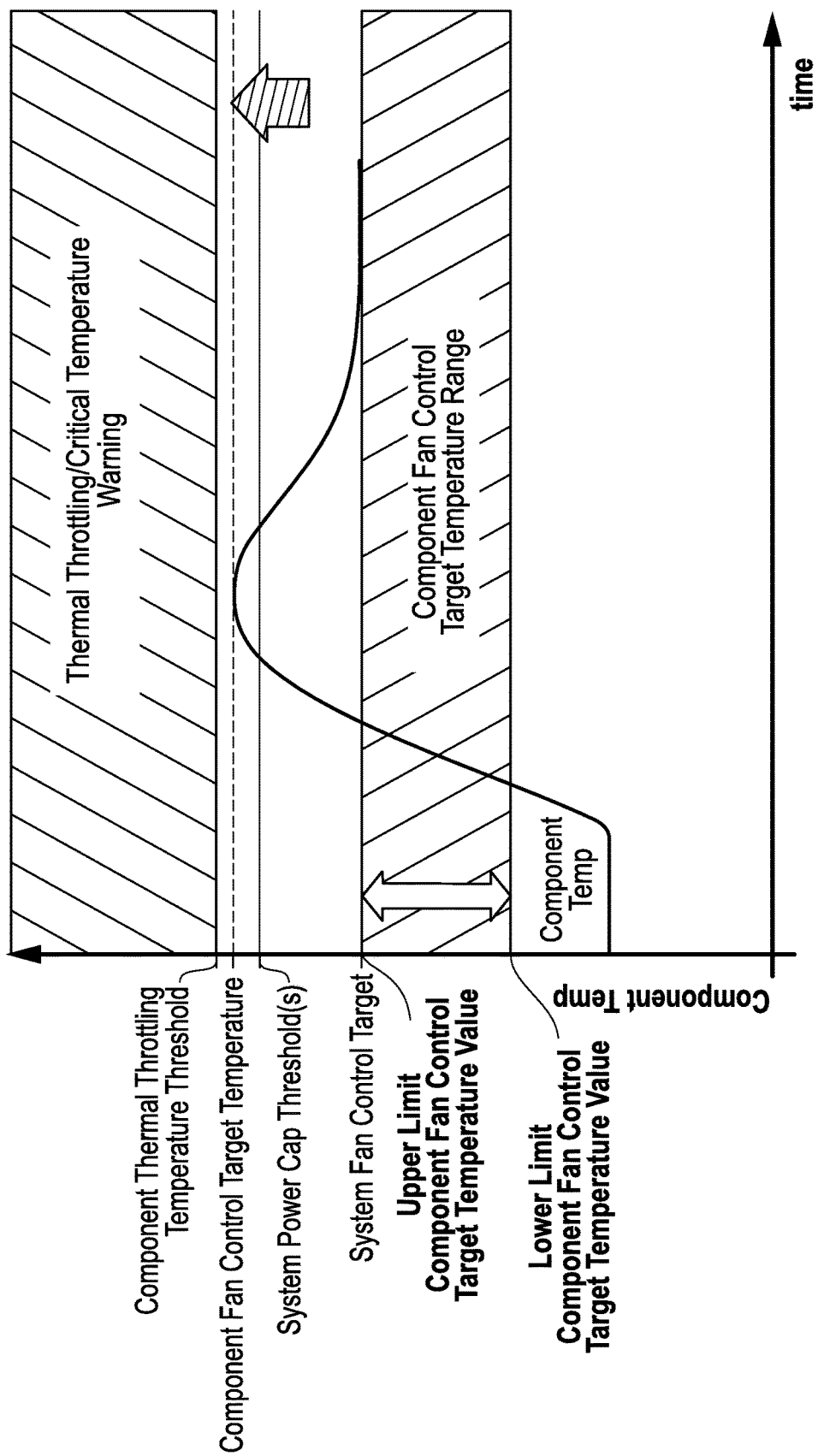
FIG. 9 illustrates component temperature as a function of time according to one exemplary embodiment of the disclosed systems and methods.

FIG. 9 illustrates another exemplary embodiment in which the range of different component fan control target temperature setpoint values that may be read from register 505 of a given CPU device 506 or other type of heat-producing component and used by system out-of-band processing device 508 to implement adaptive thermal control may be limited to a defined permissible component fan control target temperature value range that is stored in thermal control parameters 542 (e.g., thermal control table) of persistent storage 540. It will be understood that FIG. 9 is exemplary only, and that a permissible range of other types of component thermal control parameters (e.g., permissible range of component power capping threshold such as component thermal throttling temperature threshold values) may be defined and similarly applied to limit the range of the other types of component thermal control parameters.

Specifically, adaptive thermal control logic 545 of out-of-band processing device 508 may be configured to only use values of selected component fan control target setpoint temperature that are within the specified component fan control target temperature value range for adaptive thermal control, such that the actual component fan control target temperature setpoint value read from the CPU register 505 or register 505 of other type of heat-producing component is only used as a basis for thermal control as long as it falls within the component fan control target temperature value range. However, if the particular fan control target temperature setpoint value read from the component register 505 exceeds the upper limit of the specified component fan control target temperature value range (such as may be the case when component fan control target temperature is increased as shown by the cross-hatched arrow in FIG. 9), adaptive thermal control logic 545 of out-of-band processing device 508 may be configured to use the specified upper limit component fan control target temperature setpoint value as a selected component fan control target setpoint temperature value instead. Similarly, if the component fan control target temperature setpoint value read from the component register 505 is below the lower limit of the specified component fan control target temperature value range, adaptive thermal control logic 545 of out-of-band processing device 508 may be configured to instead use the specified lower limit component fan control target temperature setpoint value as a selected component fan control target setpoint temperature value. In this way, component fan control target temperature setpoint value from a component register 505 may change as long as it is within the temperature value range set within the thermal control parameters 542, and this allows some flexibility for the component (e.g., CPU) manufacturer to change the component fan control target temperature requirement within the constraints of a system manufacturer system platform design.

It will be understood that the component fan control target temperature value range illustrated in FIG. 9 is exemplary only, and that the range of values and/or absolute upper limit and lower limit values may vary as needed or desired. Further, it is possible to implement a component fan control target temperature value range having only a upper limit component fan control target temperature value (i.e., with no specified lower limit component fan control target temperature value), or to implement a component fan control target temperature value range having only a lower limit component fan control target temperature value (i.e., with no specified upper limit component fan control target temperature value).

Figure 10:
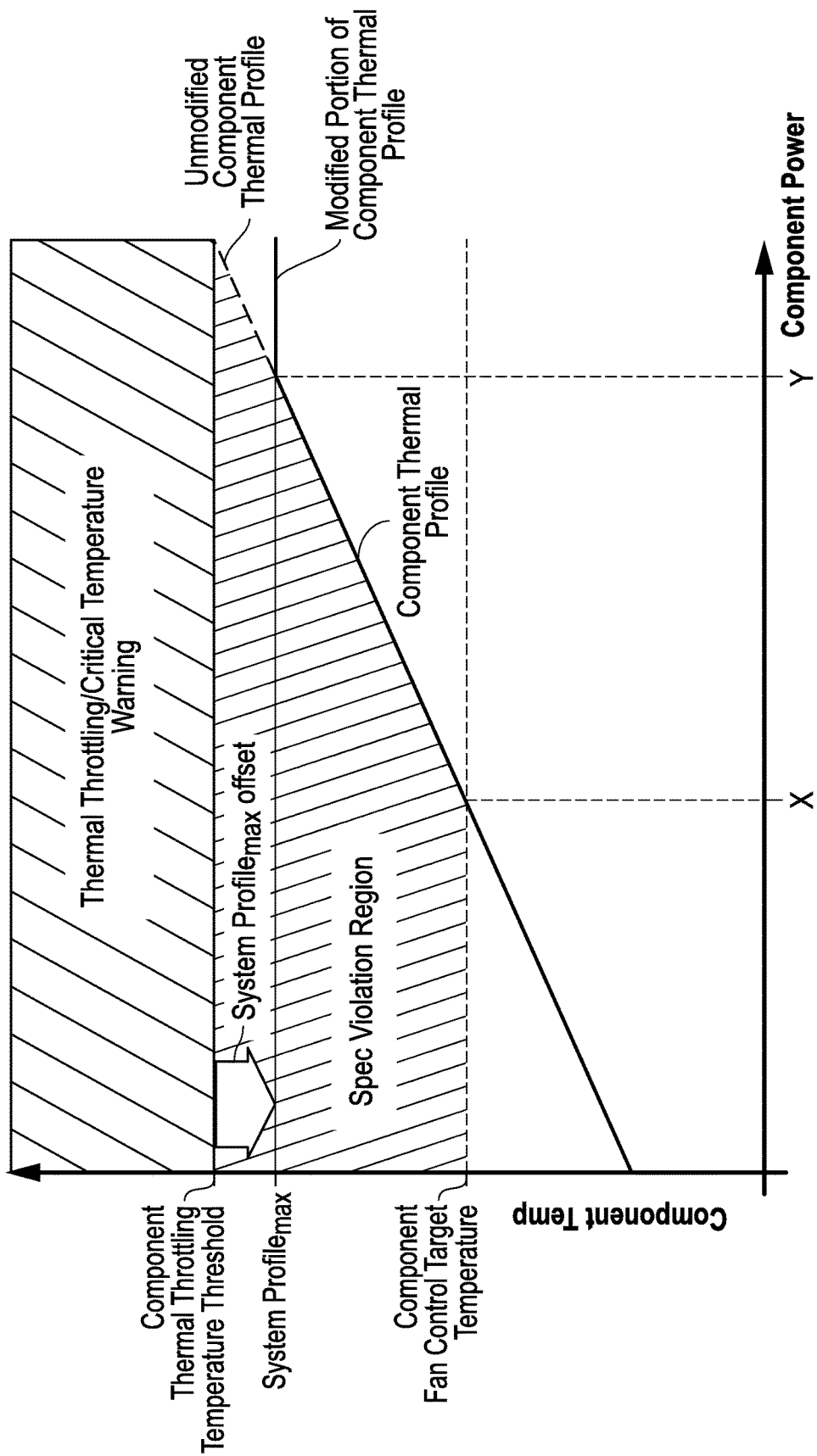
FIG. 10 illustrates component temperature as a function of component power according to one exemplary embodiment of the disclosed systems and methods.

FIG. 10 illustrates another exemplary embodiment in which a component thermal profile (e.g., for a CPU 506 or other type of heat-producing component) may be optionally specified by the component manufacturer to define a variable component fan control target setpoint, e.g., optionally in conjunction with a fixed component fan control target temperature setpoint value described previously. As shown in FIG. 10, component thermal profile is specified as a function or relationship between real time current component operating temperature and real time current component operating power. This relationship may be stored by the component manufacturer in register 505 of the heat-producing component which may be a CPU 506, it being understood that a component thermal profile may be similarly specified as a function of real time current component operating temperature for other types of heat-generating components described herein.

In one embodiment, out-of-band processing device 508 may be configured to use the particular value of component fan control target setpoint temperature that is read from the component thermal profile of the plot of FIG. 10 at the current component (e.g., CPU device 506) operating power (x-axis of FIG. 10) as a selected component fan control target setpoint temperature value for controlling fan speed to cool the component (e.g., CPU device 506), i.e., rather than using a fixed component fan control target temperature setpoint value at all values of component operating power in the manner previously described. In another embodiment, out-of-band processing device 508 may be optionally configured to use the fixed component fan control target temperature setpoint value as a selected component fan control target setpoint temperature value for fan speed control across a range of component operating power values up to the point where the component thermal profile value intersects the fixed component fan control target temperature setpoint value (i.e., point labeled as point "X" in FIG. 10). At component operating power values above this point, out-of-band processing device 508 may be configured to use the particular component thermal profile value from the plot of FIG. 10 as a selected component fan control target setpoint temperature at the current component operating power. In the latter embodiment, a "Spec Violation Region" area in which out-of-band processing device 508 utilizes increased fan speed control for cooling the component (e.g., CPU device 506) is thus defined by the fixed component fan control target temperature and component thermal profile values as a function of component operating power as denoted by the hatched area in FIG. 10. In any event, a fixed component fan control target temperature setpoint temperature value may be directly used as a system fan control target setpoint value to trigger increased cooling fan speed, or a system manufacturer system fan control target setpoint value may be set as an offset from the fixed component fan control target temperature setpoint value (e.g., in a manner as previous described) and/or from the component thermal profile value, as the case may be.

Still referring the embodiment of FIG. 10, the unmodified component thermal profile set by the component manufacturer (and stored in register 505 of a heat-producing component) increases with increasing component operating power to allow the selected component fan control target setpoint temperature value to become very close or equal to the specified component thermal throttling temperature threshold value. As further shown, a system maximum component thermal profile value (System Profile$_{MAX}$) may be specified (e.g., by the information handling system manufacturer) in order to define a modified relationship between component thermal profile and current (real time) component (e.g., CPU) operating power. This System Profile$_{MAX}$ temperature may be implemented as a fixed value or as an offset value from component thermal throttling temperature threshold value as shown, for example, by adaptive thermal control logic 545 of out-of-band processing device 508.

As shown in FIG. 10, the component thermal profile used by out-of-band processing device 508 as a basis for selecting component fan control target setpoint temperature to control cooling fan speed is allowed to track the unmodified component thermal profile (in a manner as described above) as the current component operating power increases up to the component operating power value ("Y") point where the unmodified component thermal profile intersects the System Profile$_{MAX}$ temperature. At real time component operating power values above this point "Y" the component thermal profile is modified so that a selected component fan control target setpoint temperature that is used by out-of-band processing device 508 to trigger increased cooling fan speed is limited to the System Profile$_{MAX}$ temperature value. Thus, the System Profile$_{MAX}$ temperature may be implemented as shown by adaptive thermal control logic 545 of out-of-band processing device 508) to limit the maximum value of component fan control target setpoint temperature relative to the component thermal throttling temperature threshold value and independent of what the unmodified component thermal profile or other type of component fan control target setpoint temperature profile calculates so as to prevent risk of component thermal throttling control circuitry activation, e.g., in the case of slight component temperature overshoot above the component thermal throttling temperature threshold value.

It will also be understood that one or more of the tasks, functions, or methodologies described herein (e.g., including those described herein for components 506, 508, 509, 530, 517, 580, 518, 521, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
    a chassis enclosure;
    at least one heat-generating component to be cooled that is contained within the chassis enclosure that consumes electrical power for operation, the heat-generating component including memory storing at least one component thermal control parameter that includes at least one of a component thermal throttling temperature threshold value or a component fan control target setpoint temperature value;
    at least one temperature sensor configured to sense and report an operating temperature of the heat generating component;
    one or more variable speed cooling fans configured to provide different flow rates of cooling air within the chassis enclosure to cool the heat generating component;
    system persistent storage separate from the heat-generating component to be cooled, the persistent storage including system thermal control parameter information stored thereon, the system thermal control parameter information defining a permissible range of values for the at least one component thermal control parameter; and
    at least one processing device separate from the heat generating component that is coupled to receive values of real time sensed component temperature from the temperature sensor, and to provide control signals to control a fan speed of each of the cooling fans to cool the heat-generating component and/or to control power consumption of the heat-generating component;
    where the processing device is coupled to retrieve the at least one component thermal control parameter stored in the memory of the heat-generating component, and is further coupled to retrieve the system thermal control parameter information including the permissible range of values for the at least one component thermal control parameter from the system persistent storage;
    where the processing device is configured to compare the retrieved component thermal control parameter to the defined permissible range of values for the component thermal control parameter to determine if the retrieved component thermal control parameter has a value within the defined permissible range of values for the component thermal control parameter, and to use the retrieved component thermal control parameter to control cooling fan speed of one or more of the cooling devices and/or control power consumption of the heat-generation component if the retrieved component thermal control parameter is determined to be within the defined permissible range of values for the component thermal control parameter; and at least one of:
        use the maximum value of the defined permissible range of values for the component thermal control parameter to control cooling fan speed of one or more of the cooling devices and/or control power consumption of the heat-generation component if the retrieved component thermal control parameter is determined to be greater than the defined permissible range of values for the component thermal control parameter, or
        use the minimum value of the defined permissible range of values for the component thermal control parameter to control cooling fan speed of one or more of the cooling devices and/or control power consumption of the heat-generation component if the retrieved component thermal control parameter is determined to be less than the defined permissible range of values for the component thermal control parameter.

2. The system of claim 1, where the processing device is further configured to:
    use the retrieved component thermal control parameter to control cooling fan speed of one or more of the cooling devices and/or control power consumption of the heat-generation component only if the retrieved component thermal control parameter is determined to be within the defined permissible range of values for the component thermal control parameter; and
    use the maximum value of the defined permissible range of values for the component thermal control parameter to control cooling fan speed of one or more of the cooling devices and/or control power consumption of the heat-generation component if the retrieved component thermal control parameter is determined to be greater than the defined permissible range of values for the component thermal control parameter, and
    use the minimum value of the defined permissible range of values for the component thermal control parameter to control cooling fan speed of one or more of the cooling devices and/or control power consumption of the heat-generation component if the retrieved component thermal control parameter is determined to be less than the defined permissible range of values for the component thermal control parameter.

3. The system of claim 2, where the processing device is configured to determine a value of a system fan control target setpoint temperature by subtracting an offset value from the selected component fan control target setpoint temperature value, and to control cooling fan speed of one or more of the cooling devices based on the determined system fan control target setpoint temperature and the real time current sensed component temperature.

4. The system of claim 1, where the retrieved component thermal control parameter is a retrieved component fan control target setpoint temperature; where the defined permissible range of values for the component thermal control parameter is a permissible range of values of component fan control target setpoint temperature; and where the processing device is configured to compare the retrieved component fan control target setpoint temperature to the permissible range of values of component fan control target setpoint temperature to determine if the retrieved component fan control target setpoint temperature has a value within the defined permissible range of values of component fan control target setpoint temperature, and to use the retrieved component fan control target setpoint temperature value as a selected component fan control target setpoint temperature value to control cooling fan speed of one or more of the cooling devices if the retrieved component fan control target setpoint temperature is determined to be within the defined permissible range of values of component fan control target setpoint temperature; and at least one of:
    use the maximum value of the defined permissible range of values of component fan control target setpoint temperature as a selected component fan control target setpoint temperature value to control cooling fan speed of one or more of the cooling devices if the retrieved component fan control target setpoint temperature is determined to be greater than the defined permissible range of values of component fan control target setpoint temperature, or use the minimum value of the defined permissible range of values of component fan control target setpoint temperature as a selected component fan control target setpoint temperature value to control cooling fan speed of one or more of the cooling devices if the retrieved component fan control target setpoint temperature is determined to be less than the defined permissible range of values of component fan control target setpoint temperature.

5. The system of claim 1, where the retrieved component thermal control parameter is a retrieved component power capping threshold value; where the defined permissible range of values for the component thermal control parameter is a permissible range of values of component power capping threshold value; and where the processing device is configured to compare the retrieved component power capping threshold value to the permissible range of values of component power capping threshold value to determine if the retrieved component power capping threshold value has a value within the defined permissible range of values of component power capping threshold value, and to use the retrieved component power capping threshold value value as a selected component power capping threshold value value to control cooling fan speed of one or more of the cooling devices if the retrieved component power capping threshold value is determined to be within the defined permissible range of values of component power capping threshold value; and at least one of:

use the maximum value of the defined permissible range of values of component power capping threshold value as a selected component power capping threshold value value to control cooling fan speed of one or more of the cooling devices if the retrieved component power capping threshold value is determined to be greater than the defined permissible range of values of component power capping threshold value, or use the minimum value of the defined permissible range of values of component power capping threshold value as a selected component power capping threshold value value to control cooling fan speed of one or more of the cooling devices if the retrieved component power capping threshold value is determined to be less than the defined permissible range of values of component power capping threshold value.

6. The system of claim 1, where the at least one heat-generating component is a central processing unit (CPU); and where the at least one processing device that is separate from the heat-generating component is an out-of-band processing device.

7. An adaptive method for controlling cooling fan response in an information handling system, comprising:

operating at least one heat-generating component that consumes electrical power within an information handling system chassis enclosure, the heat-generating component including memory storing at least one component thermal control parameter that includes at least one of a component thermal throttling temperature threshold value or a component fan control target setpoint temperature value;

using one or more variable speed cooling fans to provide different flow rates of cooling air within the chassis enclosure to cool the heat generating component;

using at least one temperature sensor to sense an operating temperature of the heat generating component in real time;

using at least one processing device separate from the heat generating component to:

retrieve the component thermal control parameter value stored in the memory of the heat-generating component, and receive values of real time sensed component operating temperature from the temperature sensor;

using at least one processing device separate from the heat generating component to compare the retrieved component thermal control parameter to a defined permissible range of values for the component thermal control parameter to determine if the retrieved component thermal control parameter has a value within the defined permissible range of values for the component thermal control parameter, and to:

use the retrieved component thermal control parameter to control cooling fan speed of one or more of the cooling devices and/or control power consumption of the heat-generation component if the retrieved component thermal control parameter is determined to be within the defined permissible range of values for the component thermal control parameter, or use the maximum value of the defined permissible range of values for the component thermal control parameter to control cooling fan speed of one or more of the cooling devices and/or control power consumption of the heat-generation component if the retrieved component thermal control parameter is determined to be greater than the defined permissible range of values for the component thermal control parameter, or use the minimum value of the defined permissible range of values for the component thermal control parameter to control cooling fan speed of one or more of the cooling devices and/or control power consumption of the heat-generation component if the retrieved component thermal control parameter is determined to be less than the defined permissible range of values for the component thermal control parameter.

8. The method of claim 7, further comprising using the at least one processing device to:

use the retrieved component thermal control parameter to control cooling fan speed of one or more of the cooling devices and/or control power consumption of the heat-generation component if the retrieved component thermal control parameter is determined to be within the defined permissible range of values for the component thermal control parameter; and use the maximum value of the defined permissible range of values for the component thermal control parameter to control cooling fan speed of one or more of the cooling devices and/or control power consumption of the heat-generation component if the retrieved component thermal control parameter is determined to be greater than the defined permissible range of values for the component thermal control parameter; and use the minimum value of the defined permissible range of values for the component thermal control parameter to control cooling fan speed of one or more of the cooling devices and/or control power consumption of the heat-generation component if the retrieved component thermal control parameter is determined to be less than the defined permissible range of values for the component thermal control parameter.

9. The method of claim 8, where the retrieved component thermal control parameter is a retrieved component fan control target setpoint temperature; where the defined permissible range of values for the component thermal control parameter is a permissible range of values of component fan control target setpoint temperature; and where the method further comprises using the processing device to compare the retrieved component fan control target setpoint temperature to the permissible range of values of component fan control target setpoint temperature to determine if the retrieved component fan control target setpoint temperature has a value within the defined permissible range of values of component fan control target setpoint temperature, and to use the retrieved component fan control target setpoint temperature value as a selected component fan control target setpoint temperature value to control cooling fan speed of one or more of the cooling devices if the retrieved component fan control target setpoint temperature is determined to be within the defined permissible range of values of component fan control target setpoint temperature; and at least one of:

use the maximum value of the defined permissible range of values of component fan control target setpoint temperature as a selected component fan control target setpoint temperature value to control cooling fan speed of one or more of the cooling devices if the retrieved component fan control target setpoint temperature is determined to be greater than the defined permissible range of values of component fan control target setpoint temperature; or use the minimum value of the defined permissible range of values of component fan control target setpoint temperature as a selected component fan control target setpoint temperature value to control cooling fan speed of one or more of the cooling devices if the retrieved component fan control target setpoint temperature is determined to be less than the defined permissible range of values of component fan control target setpoint temperature.

10. The method of claim 9, further comprising using the processing device to determine a value of a system fan control target setpoint temperature by subtracting an offset value from the selected component fan control target setpoint temperature value, and to control cooling fan speed of one or more of the cooling devices based on the determined system fan control target setpoint temperature and the real time current sensed component temperature.

11. The method of claim 8, where the retrieved component thermal control parameter is a retrieved component power capping threshold value; where the defined permissible range of values for the component thermal control parameter is a permissible range of values of component power capping threshold value; and where the method further comprises using the processing device to compare the retrieved component power capping threshold value to the permissible range of values of component power capping threshold value to determine if the retrieved component power capping threshold value has a value within the defined permissible range of values of component power capping threshold value, and to use the retrieved component power capping threshold value value as a selected component power capping threshold value value to control cooling fan speed of one or more of the cooling devices if the retrieved component power capping threshold value is determined to be within the defined permissible range of values of component power capping threshold value; and at least one of:

use the maximum value of the defined permissible range of values of component power capping threshold value as a selected component power capping threshold value value to control cooling fan speed of one or more of the cooling devices if the retrieved component power capping threshold value is determined to be greater than the defined permissible range of values of component power capping threshold value; or use the minimum value of the defined permissible range of values of component power capping threshold value as a selected component power capping threshold value value to control cooling fan speed of one or more of the cooling devices if the retrieved component power capping threshold value is determined to be less than the defined permissible range of values of component power capping threshold value.

12. The method of claim 8, where the at least one heat-generating component is a central processing unit (CPU); and where the at least one processing device that is separate from the heat-generating component is an out-of-band processing device.

13. An information handling system, comprising:

a chassis enclosure;

at least one heat-generating component to be cooled that is contained within the chassis enclosure that consumes electrical power for operation, the heat-generating component including memory storing a component thermal throttling temperature threshold value and a component thermal profile that is specified as a relationship between component operating temperature and component operating power that is limited at an upper value by the component thermal throttling temperature threshold value;

at least one temperature sensor configured to sense and report an operating temperature of the heat generating component;

one or more variable speed cooling fans configured to provide different flow rates of cooling air within the chassis enclosure to cool the heat generating component;

system persistent storage separate from the heat-generating component to be cooled, the persistent storage including system thermal control parameter information stored thereon, the system thermal control parameter information including a system maximum component thermal profile value; and at least one processing device separate from the heat generating component that is coupled to receive values of real time sensed component temperature from the temperature sensor, to receive values of real time component power consumption from the heat-generating component, and to provide control signals to control a fan speed of each of the cooling fans to cool the heat-generating component;

where the processing device is coupled to retrieve the component thermal throttling temperature threshold value and the fan control target setpoint temperature profile stored in the memory of the heat-generating component, and is further coupled to retrieve the system maximum component thermal profile value from the system persistent storage;

where the processing device is configured to:
use the component thermal profile to determine a profile-based component fan control target setpoint temperature value as a function of received real time current component power consumption and use the determined profile-based component fan control target setpoint temperature value as a selected component fan control target setpoint temperature value to control cooling fan speed of one or more of the cooling devices if the determined profile-based component fan control target setpoint temperature value is less than or equal to the system maximum component thermal profile value, and use the system maximum component thermal profile value as a selected component fan control target setpoint temperature value to control cooling fan speed of one or more of the cooling devices if the determined profile-based component fan control target setpoint temperature value is greater than the system maximum component thermal profile value.

14. The system of claim 13, where the processing device is further configured to:

use a fixed component fan control target temperature setpoint value that is less than the system maximum component thermal profile value as a selected component fan control target setpoint temperature value to control cooling fan speed of one or more of the cooling devices if the fixed component fan control target temperature setpoint value is greater than or equal to the profile-based component fan control target setpoint temperature value determined from the component thermal profile at the received real time current component power consumption; and use the determined profile-based component fan control target setpoint temperature value as a selected component fan control target setpoint temperature value to control cooling fan speed of one or more of the cooling devices if the fixed component fan control target temperature setpoint value is less than the profile-based component fan control target setpoint temperature value determined from the component thermal profile at the received real time current component power consumption, and if the determined profile-based component fan control target setpoint temperature value is less than or equal to the system maximum component thermal profile value.

15. The system of claim 13, where the processing device is configured to determine a value of a system fan control target setpoint temperature by subtracting an offset value from the selected component fan control target setpoint temperature value, and to control cooling fan speed of one or more of the cooling devices based on the determined system fan control target setpoint temperature and the real time current sensed component temperature.

16. The system of claim 13, where the at least one heat-generating component is a central processing unit (CPU); and where the at least one processing device that is separate from the heat-generating component is an out-of-band processing device.

17. An adaptive method for controlling cooling fan response in an information handling system, comprising:

operating at least one heat-generating component that consumes electrical power within an information handling system chassis enclosure, the heat-generating component including memory storing at least one component thermal control parameter that includes a component thermal throttling temperature threshold value and a component thermal profile that is specified as a relationship between component operating temperature and component operating power that is limited at an upper value by the component thermal throttling temperature threshold value;

using one or more variable speed cooling fans to provide different flow rates of cooling air within the chassis enclosure to cool the heat generating component;

using at least one temperature sensor to sense an operating temperature of the heat generating component in real time;

using at least one processing device separate from the heat generating component to:

retrieve the component thermal throttling temperature threshold value and the component thermal profile stored in the memory of the heat-generating component, and receive values of real time sensed component temperature from the temperature sensor, and to receive values of real time component power consumption from the heat-generating component; and using at least one processing device separate from the heat generating component to:

use the component thermal profile to determine a profile-based component fan control target setpoint temperature value as a function of received real time current component power consumption, and use the determined profile-based component fan control target setpoint temperature value as a selected component fan control target setpoint temperature value to control cooling fan speed of one or more of the cooling devices if the determined profile-based component fan control target setpoint temperature value is less than or equal to a system maximum component thermal profile value that itself is set less than the component thermal throttling temperature threshold value, and use the system maximum component thermal profile value as a selected component fan control target setpoint temperature value to control cooling fan speed of one or more of the cooling devices if the determined profile-based component fan control target setpoint temperature value is greater than the system maximum component thermal profile value.

18. The method of claim 17, further comprising using the at least one processing device separate from the heat generating component to:

use a fixed component fan control target temperature setpoint value that is less than the system maximum component thermal profile value as a selected component fan control target setpoint temperature value to control cooling fan speed of one or more of the cooling devices if the fixed component fan control target temperature setpoint value is greater than or equal to the profile-based component fan control target setpoint temperature value determined from the component thermal profile at the received real time current component power consumption; and use the determined profile-based component fan control target setpoint temperature value as a selected component fan control target setpoint temperature value to control cooling fan speed of one or more of the cooling devices if the fixed component fan control target temperature setpoint value is less than the profile-based component fan control target setpoint temperature value determined from the component thermal profile at the received real time current component power consumption, and if the determined profile-based component fan control target setpoint temperature value is less than or equal to the system maximum component thermal profile value.

19. The method of claim 17, further comprising using the processing device to determine a value of a system fan control target setpoint temperature by subtracting an offset value from the selected component fan control target setpoint temperature value, and to control cooling fan speed of one or more of the cooling devices based on the determined system fan control target setpoint temperature and the real time current sensed component temperature.

20. The method of claim 17, where the at least one heat-generating component is a central processing unit (CPU); and where the at least one processing device that is separate from the heat-generating component is an out-of-band processing device.

* * * * *